(12) United States Patent
Khripkov et al.

(10) Patent No.: US 10,581,284 B2
(45) Date of Patent: Mar. 3, 2020

(54) WIRELESS CHARGER AND WIRELESS POWER RECEIVER

(71) Applicant: Samsung Electronics Co., Ltd., Suwon-si, Gyeonggi-do (KR)

(72) Inventors: Alexander Khripkov, Moscow (RU); Konstantin Pavlov, Moscow (RU); Mikhail Makurin, Arkhangelsk (RU); Nikolay Olyunin, Perm (RU); Do-won Kim, Suwon-si (KR); Vladimir Arkhipenkov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 648 days.

(21) Appl. No.: 14/971,263

(22) Filed: Dec. 16, 2015

(65) Prior Publication Data
US 2016/0172894 A1 Jun. 16, 2016

(30) Foreign Application Priority Data

Dec. 16, 2014 (RU) .................................. 2014150992
Dec. 4, 2015 (KR) ......................... 10-2015-0172657

(51) Int. Cl.
*H02J 50/70* (2016.01)
*H02J 50/40* (2016.01)

(52) U.S. Cl.
CPC .............. *H02J 50/70* (2016.02); *H02J 50/40* (2016.02)

(58) Field of Classification Search
None
See application file for complete search history.

(56) References Cited

U.S. PATENT DOCUMENTS

| 5,038,110 A * | 8/1991 | Braun .................. G01D 5/2405 324/675 |
| 8,169,185 B2 | 5/2012 | Partovi et al. |
| 2003/0067284 A1* | 4/2003 | Costello .................. F02C 7/266 322/59 |

(Continued)

FOREIGN PATENT DOCUMENTS

| RU | 124 852 U1 | 7/2012 |
| RU | 124852 U1 | 2/2013 |

(Continued)

OTHER PUBLICATIONS

WO 2014148311 Translation, Kumura, Coil Module, Antenna Device, and Electronic Device Sep. 2014.*

(Continued)

*Primary Examiner* — Robert Grant
*Assistant Examiner* — Tynese V McDaniel
(74) *Attorney, Agent, or Firm* — Jefferson IP Law, LLP

(57) ABSTRACT

A wireless charging system and method are provided, that are capable of simultaneously charging multiple mobile devices, providing high power transfer efficiency for multiple mobile devices located at any position and orientation, and minimizing electromagnetic radiation from a transmitting (TX) coil and a receiving (RX) coil. The method and structure reduce electromagnetic interference (EMI) radiation by shunting in-phase currents flowing in a wireless power transmitting unit (TX unit) and a wireless power receiving unit (RX unit) of a wireless charging system.

19 Claims, 28 Drawing Sheets

(56) References Cited

U.S. PATENT DOCUMENTS

| | | | |
|---|---|---|---|
| 2003/0163748 A1* | 8/2003 | Calkins | H04B 15/04 713/500 |
| 2008/0067874 A1 | 3/2008 | Tseng | |
| 2010/0156343 A1 | 6/2010 | Jung | |
| 2011/0133570 A1 | 6/2011 | Mayo et al. | |
| 2011/0198937 A1 | 8/2011 | Tseng | |
| 2012/0049645 A1* | 3/2012 | Kozakai | H04B 5/0037 307/104 |
| 2012/0228959 A1 | 9/2012 | Mayo et al. | |
| 2012/0235506 A1 | 9/2012 | Kallal et al. | |
| 2012/0235636 A1* | 9/2012 | Partovi | H02J 7/025 320/108 |
| 2013/0038136 A1* | 2/2013 | Wheatley | G06K 7/0008 307/104 |
| 2013/0077360 A1* | 3/2013 | Low | H02J 50/12 363/47 |
| 2013/0099807 A1 | 4/2013 | Wheeland et al. | |
| 2013/0342026 A1* | 12/2013 | Mishina | H02J 5/005 307/104 |
| 2014/0361979 A1* | 12/2014 | Woo | H01Q 1/243 345/156 |
| 2016/0104937 A1* | 4/2016 | Kumura | H01Q 1/2208 343/788 |
| 2016/0218420 A1* | 7/2016 | Leung | H01Q 1/3233 |

FOREIGN PATENT DOCUMENTS

| | | | | |
|---|---|---|---|---|
| RU | 2 519 389 C1 | 6/2014 | | |
| RU | 2 534 020 C1 | 11/2014 | | |
| RU | 2534020 C1 | 11/2014 | | |
| WO | 2008/035248 A2 | 3/2008 | | |
| WO | 2013-022255 A2 | 2/2013 | | |
| WO | 2013-142720 A1 | 9/2013 | | |
| WO | WO 2014148311 A1 * | 9/2014 | ........... | H01Q 1/2208 |
| WO | WO 2015050994 A1 * | 4/2015 | ........... | H01Q 1/3233 |

OTHER PUBLICATIONS

Anil Kumer Ramrakyani, Shahriar Mirabbasi and Mu Chiao, "Design and Optimization of Resonance-Based Efficient Wireless Power Delivery Systems for Biomedical Implants", IEEE Transactions of Biomedical Circuits and Systems, vol. 5, No. 1, pp. 48-63, Feb. 2011.

A. K. RamRakhyani, S. Mirabbasi, and M. Chiao, "Design and optimization of resonance-based efficient wireless power delivery systems for biomedical implants", Circuits and Systems, IEEE Transactions on, vol. 5, issue 1, abstract, p. 1, Feb. 2011.

U.-M. Jow, M. Ghovanloo, "Modeling and Optimization of Printed Spiral Coils in Air, Saline, and Muscle Tissue Environments", Biomed. Circuits and Systems, IEEE Transactions on, vol. 3, No. 5, pp. 339-344, 2009. 3.

* cited by examiner

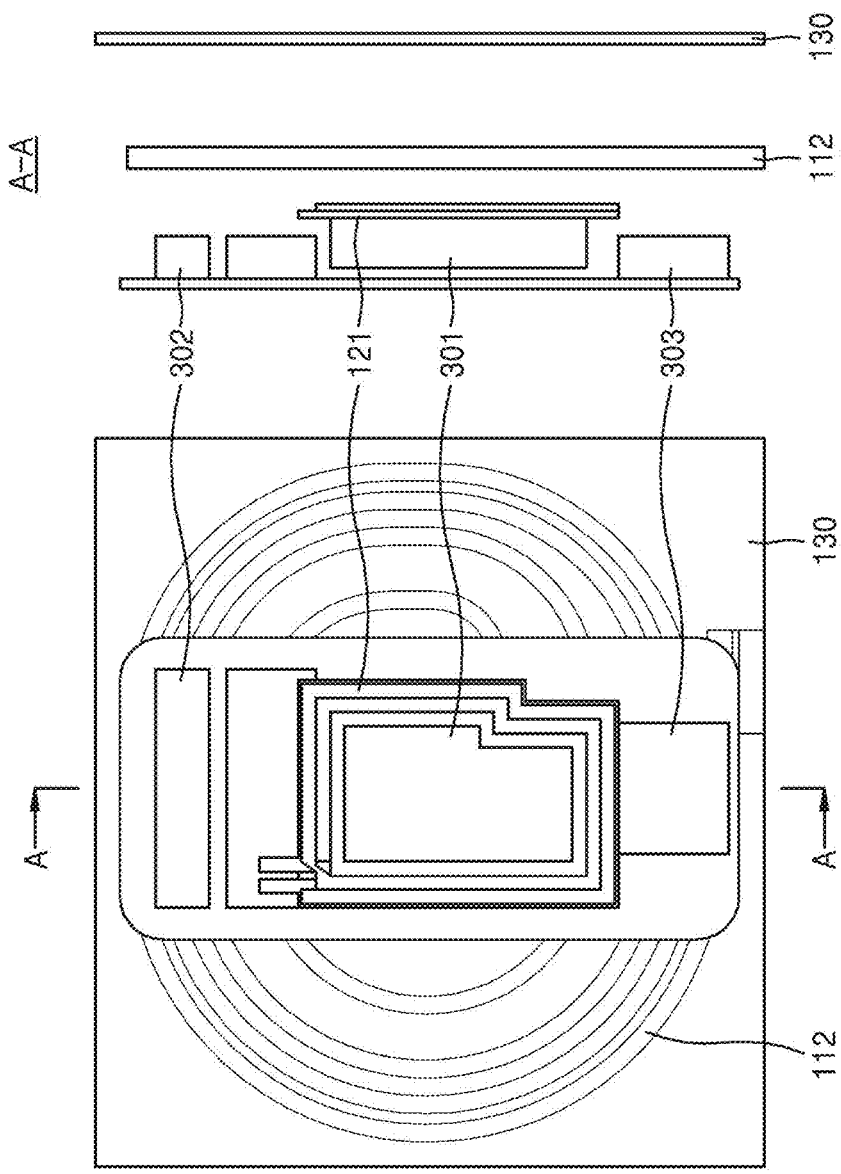

FIG. 17A
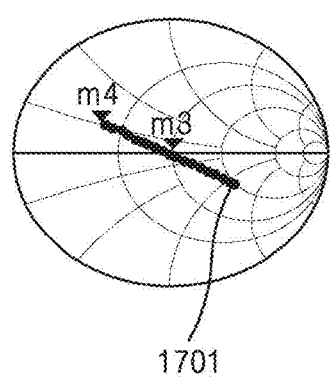
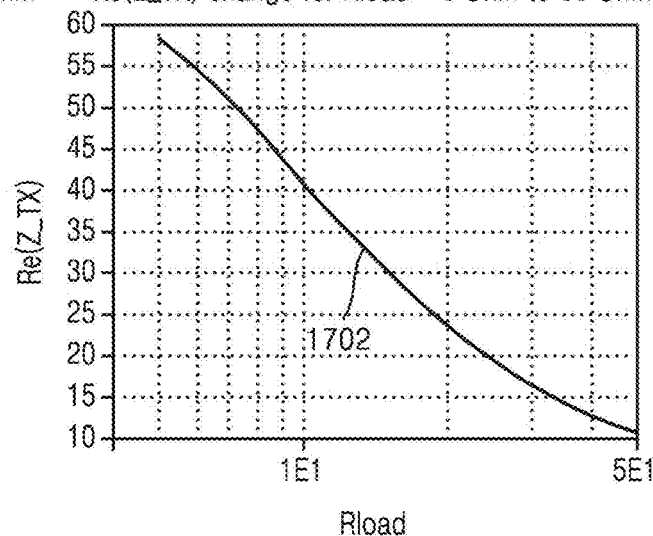

FIG. 17B
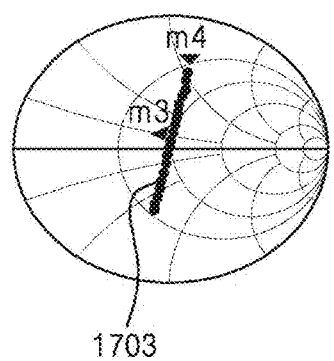
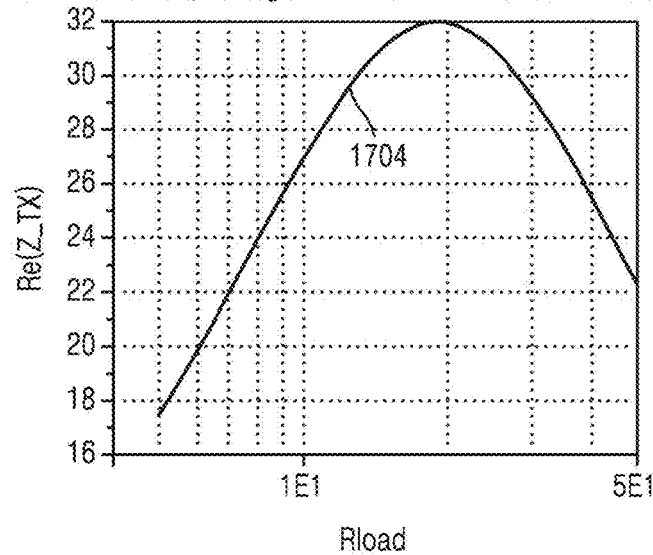

VSWR = 1.46
PTE = 86.4%
k = 0.143

VSWR = 1.54
PTE = 86.4%
k = 0.175

VSWR = 1.22
PTE = 90.3%
k = 0.182

VSWR = 1.4
PTE = 86.8%
k = 0.146

VSWR = 1.7
PTE = 84.5%
k = 0.185

VSWR = 1.4
PTE = 86.8%
k = 0.146

WIRELESS CHARGER AND WIRELESS POWER RECEIVER

CROSS-REFERENCE TO RELATED APPLICATION(S)

This application claims the benefit under 35 U.S.C. § 119(a) of a Russian patent application filed on Dec. 16, 2014 in the Russian Patent and Trademark Office and assigned Serial number 2014150992, and of a Korean patent application filed on Dec. 4, 2015 in the Korean Intellectual Property Office and assigned Serial number 10-2015-0172657, the entire disclosure of each of which is hereby incorporated by reference.

TECHNICAL FIELD

The present disclosure relates to wireless power transfer (WPT) technology. More particularly, the present disclosure relates to a device for a wireless charging system configured to charge a plurality of mobile devices simultaneously. Mobile devices are charged using magnetic field coupling that is achieved through a power transmitting (TX) resonator and a power receiving (RX) resonator.

BACKGROUND

A plurality of development groups are studying wireless power transfer (WPT) systems for providing spatial freedom to energy transmitters and energy receivers. Analyses about coils coupled in various geometrical structures in terms of design and theory, geometrical optimization, and a common optimization approach using spiral coils having a plurality of layers of spirals or a plurality of turns have been dealt with in the related art. Optimization of power inducement of coils, in which no shielding elements are used and no wireless charging systems are applied, has also been dealt with in the related art. A method of providing uniform magnetic coupling between a transmitting (TX) coil and a receiving (RX) coil based on the size of the TX coil that is much greater than that of the RX coil has also been dealt with in the related art. It has already been proved that the uniform magnetic coupling between a TX coil and an RX coil enables power to be transmitted with uniform power transmitting efficiency (PTE).

WPT technology has been developed for mobile and wearable electronic devices in order to provide a convenient method for charging embedded batteries of the devices or a supply power connected thereto. Wireless chargers to which WPT technology is applied operate typically in the frequency range from 100 kHz to 100 MHz.

A wirelessly chargeable mobile device has a battery pack, and an RX coil mounted therein according to the related art. The wirelessly chargeable mobile device is charged when located in proximity to a TX coil of a wireless charger according to the related art. An induced electromotive force is generated in the RX coil by a magnetic field formed by the TX coil, and electricity induced from that electromotive force charges the mobile device.

The most common wireless power charger architecture is a star topology network. The wireless charger interacts with one or more mobile devices for simultaneous charging. Wireless coupling is achieved through a power TX resonator and a power RX resonator, and magnetically coupled inductive coils connect the TX resonator to the RX resonator. A power source is connected to the TX resonator, and the RX resonator is connected to a rectifier to transform energy from an alternating current (AC) to a direct current (DC) at the receiver side.

The major issue of long range and/or alignment insensitive wireless chargers is high level of electromagnetic interference (EMI) radiation. Large size, loosely coupled wireless chargers utilize high switching voltages and high currents in large-size primary coils, thereby posing EMI hazards to other electronic products.

The above information is presented as background information only, to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wireless charger and a wireless power receiver capable of reducing electromagnetic interference (EMI) radiation by shunting, to a shielding element, in-phase currents flowing in a wireless power transmitting unit (TX unit) and a wireless power receiving unit (RX unit) of a wireless charging system.

Additional aspects will be set forth in part in the description which follows and, in part, will be apparent from the description, or may be learned by practice of the presented exemplary embodiments.

In accordance with an aspect of the present disclosure, a wireless charger is provided. The wireless charger includes a transmitting (TX) coil, a shielding element formed of a conductive material, and an impedance matching circuit configured to connect a power source to the TX coil, wherein the impedance matching circuit includes at least two capacitors which are connected to the TX coil in parallel and connect the TX coil to a ground of the power source and to the shielding element.

According to an embodiment, at least one tap of the transmitting coil may be connected to the shielding element and to the ground of the power source.

According to an embodiment, the at least one tap may be connected to the shielding element and to the ground of the power source via galvanic or capacitive connection.

According to an embodiment, the capacitive connection may be formed by lumped capacitor elements or by mutual capacitance between the at least one tap and the shielding element.

According to an embodiment, the at least one tap may include a center tap of the transmitting coil.

According to an embodiment, the wireless charger may further include self-resonant absorbing elements placed between the transmitting coil and the shielding element.

According to an embodiment, resonant frequencies of the self-resonant absorbing elements may be tuned to be equal to frequencies of peaks of electromagnetic radiation emitted by the transmitting coil.

According to an embodiment, the shielding element may be made of at least one of a copper material and a ferrite material.

According to an embodiment, gaps between conductive turns of the transmitting coil may decrease in a direction away from a center area of the transmitting coil.

According to an embodiment, the turns of the transmitting coil may have maximum curvature radiuses at outer edges of the transmitting coil and minimum curvature radiuses in a center area of the transmitting coil.

In accordance with another aspect of the present disclosure, a wireless power receiver connectable to a battery is provided. The wireless power receiver includes an RX coil, and an impedance matching circuit configured to connect the RX coil to the battery. The impedance matching circuit includes at least two capacitors which are connected to the RX coil in parallel and connect the RX coil to a ground of the battery.

According to an embodiment, a shielding element formed of a conductive material may be disposed between the receiving coil and the load.

According to an embodiment, the shielding element may be made of at least one of a copper material and a ferrite material.

According to an embodiment, the wireless power receiver may further include at least two series capacitors serially connected to the receiving coil to connect the receiving coil to the battery, at least two inductors configured to connect each of the at least two series capacitors to the battery, and at least two capacitors configured to connect a ground of the battery to the at least two series capacitors and the at least two inductors.

According to an embodiment, the wireless power receiver may further include a rectifier connected to the impedance matching circuit.

According to an embodiment, the receiving coil may include a plurality of conductive turns, and outer dimensions of the receiving coil may be maximized within an available surface of the wireless power receiver.

In accordance with another aspect of the present disclosure, a wireless charging system is provided. The wireless charging system includes a TX unit and an RX unit. The TX unit includes a TX coil, a power source, a shielding element, and an impedance matching circuit configured to connect the TX coil to the power source, wherein the impedance matching circuit includes at least two capacitors which are connected to the TX coil in parallel and connect the TX coil to a ground of the power source and to the shielding element. The RX unit includes an RX coil, a load, and an impedance matching circuit configured to connect the receiving coil to the load, wherein the impedance matching circuit includes at least two capacitors which are connected to the receiving coil in parallel and connect the RX coil to a ground of the load.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A and 5B illustrate a structure of a wireless charging system as viewed vertically and horizontally, when an RX unit is placed on a TX unit, according to an embodiment of the present disclosure;

FIGS. 7A and 7B illustrate a method of reducing a total thickness of a TX unit, according to an embodiment of the present disclosure, wherein FIG. 7A illustrates a case when a first shielding element is formed of a copper material and FIG. 7B illustrates a case when the first shielding element is formed of a copper material and a ferrite material;

FIGS. 9A and 9B are graphs illustrating in-phase voltage spectrums for a TX coil according to connection or disconnection of shunt capacitors to or from a ground of a power source and a first shielding element, according to an embodiment of the present disclosure, wherein FIG. 9A illustrates a case where the shunt capacitors are disconnected from the ground of the power source and from the first shielding element and FIG. 9B illustrates a case where the shunt capacitors are connected to the ground of the power source and to the first shielding element;

FIGS. 17A and 17B are graphs illustrating a dependence of an impedance of a TX unit for implementation of a hybrid impedance matching circuit, according to an embodiment of the present disclosure;

Throughout the drawings, it should be noted that like reference numbers are used to depict the same or similar elements, features, and structures.

DETAILED DESCRIPTION

Figure 1:
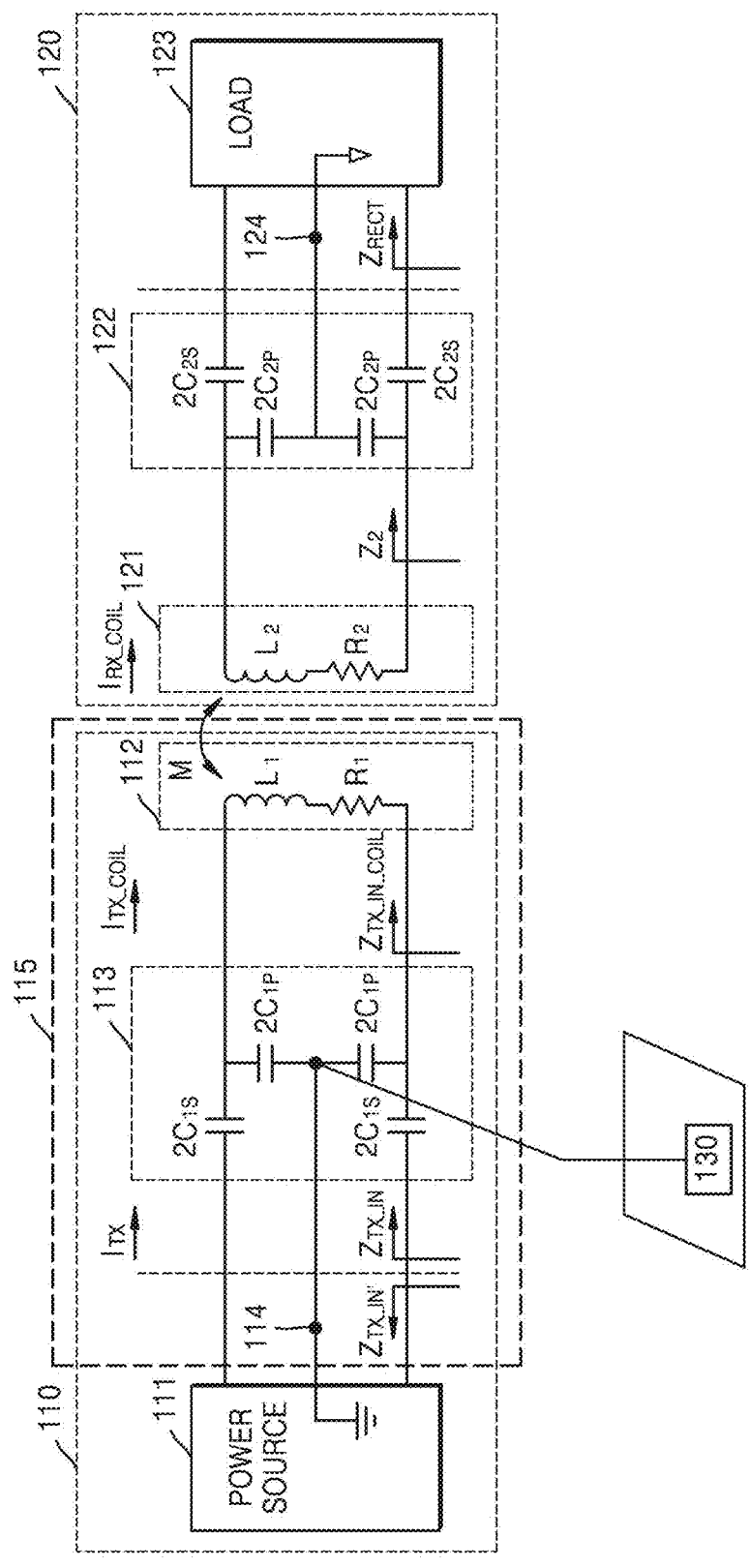
FIG. 1 illustrates an equivalent circuit of a wireless charging system, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

While the terms used herein may be used to describe various components, such components may not be limited to the above terms. The above terms are used only to distinguish one component from another.

It will be understood that when an element is referred to as being "connected" to another element, it can be directly connected to the other element or can be electrically connected to the other element with intervening elements present there between. When an element is referred to as being "connected" to another element, it can also be in a state capable of data communication via signal transmitting (TX) and receiving (RX) to and from the other element.

Throughout the specification, when a portion "includes" an element, another element may be further included, rather than excluding the existence of the other element, unless otherwise described.

The attached drawings may be schematically made to explain embodiments. Sizes of components in the drawings may be exaggerated for clarity, and similarly, many components in the drawings are arbitrarily illustrated for convenience of explanation.

The term "module" used in the specification needs to be interpreted as including software, hardware, or a combination thereof according to the context in which the term "module" is used. For example, the software may be a machine language, firmware, an embedded code, or application software. For example, the hardware may be a circuit, a processor, a computer, an integrated circuit (IC), an IC core, a sensor, a micro-electro-mechanical system (MEMS), a passive device, or a combination thereof.

The terms used in the present specification are merely used to describe particular embodiments of the present disclosure, and are not intended to limit the present disclosure. Although general terms widely used at present were selected for describing the present disclosure in consideration of the functions thereof, these general terms may vary according to intentions of one of ordinary skill in the art, case precedents, the advent of new technologies, or the like. Terms arbitrarily selected by the applicant of the present disclosure may also be used in a specific case. In this case, their meanings need to be given in the detailed description of the present disclosure. Hence, the terms should be defined based on their meanings and the contents of the entire specification, not by simply stating the terms.

An expression used in the singular encompasses the expression of the plural, unless it has a clearly different meaning in the context. In the present specification, it is to be understood that the terms such as "including," "having," and "comprising" are intended to indicate the existence of the features, numbers, actions, components, parts, or combinations thereof disclosed in the specification, and are not intended to preclude the possibility that one or more other features, numbers, actions, components, parts, or combinations thereof may exist or may be added.

Hereinafter, the present disclosure will be described more fully with reference to the accompanying drawings, in which various embodiments of the present disclosure are shown. The present disclosure may, however, be embodied in many different forms and should not be construed as being limited to the various embodiments of the present disclosure set forth herein.

In the specification, a wireless power transmitting unit (TX unit) may include a wireless charger and a power source, and a wireless power receiving unit (RX unit) may include a receiving (RX) coil, an impedance matching circuit, and a load. The wireless charger may be detachable from the power source. For example, the wireless charger may be connected to the power source for wireless charging.

The RX unit may represent mobile or other devices that operate electrically, electronically, and with batteries. The load may be the battery or battery pack of a mobile device or other devices. The RX unit may be comprised of a wireless power receiver and a load. The wireless power receiver may include an RX coil and an impedance matching circuit. The wireless power receiver may be detachable from the load. For example, the wireless power receiver may be connected to the load for wireless charging.

In the specification, a shielding element connected to a ground of the power source and a transmitting (TX) coil in the TX unit is referred to as a first shielding element, and a shielding element included in the RX unit for protecting internal components is referred to as a second shielding element.

In the specification, a first impedance matching circuit is referred to as an impedance matching circuit connected between the power source and the TX coil in the TX unit, and a second impedance matching circuit is referred to as an impedance matching circuit connected between the load and the RX coil in the RX unit.

According to an embodiment of the present disclosure, to charge the battery of a mobile device, a user may put the battery directly on a wireless charger or put the mobile device on the wireless charger. Thus, the size of the wireless charger, more particularly, a power TX resonator, is important. A large power TX resonator accommodates large TX power, and charges many mobile devices at the same time. For example, the user may connect the battery or the mobile device to the wireless power receiver and then put the wireless power receiver connected to the battery or the mobile device on the wireless charger.

When the RX unit is positioned on the wireless charger, the RX coil and the TX coil are coupled by magnetic flux that passes through the RX coil and the TX coil. Thus, magnetic flux generated by the TX coil causes a current to be generated in the RX coil, and energy is transmitted to the RX unit. The RX unit may include a rectifier connected to an output port of the RX coil, and a power operating circuit including a battery charging circuit. In detail, the rectifier may be mounted to perform alternating current (AC)-to-direct current (DC) transformation before a current induced in the RX coil reaches the load.

According to an embodiment of the present disclosure, a wireless charging system may include a TX unit and an RX unit.

According to an embodiment of the present disclosure, an impedance matching circuit of the RX coil includes at least two capacitors connected to the RX coil in parallel, and the at least two capacitors may be connected to a ground of the RX unit.

A power source provides a switching voltage and a high current to the TX coil. A large size TX coil induces conducted and radiated electromagnetic emission. The TX coil is connected to the shielding element via the at least two capacitors, and electromagnetic emission is reduced by shunting in-phase currents that flow in the TX coil.

An impedance matching circuit of the TX coil defines a variation in impedance at a transmitter side according to the load of the RX unit.

According to an embodiment of the TX coil, mutual inductance is spatially set regardless of the position of the TX coil. A gap between wires of the TX coil decreases in the direction away from the center area of the TX coil. The turns of the TX coil have maximum curvature radiuses at outer edges of the transmitting coil and minimum curvature radiuses in the center area of the transmitting coil.

According to an embodiment of the present disclosure, a center tap of the transmitting coil is connected to the shielding element and to the ground of the power source.

For simplicity, the term "transmitting coil" is recited as "TX coil", the term "receiving coil" is recited as "RX coil", the term "wireless power transmitting unit" is recited as "TX unit", and the term "wireless power receiving unit" is recited as "RX unit".

As used herein, the term "load" refers to the battery or battery pack of the electronic device. To charge the battery of the electronic device, the user needs to manually put the electronic device on the surface of the wireless charger. Therefore, the dimensions of the wireless charger are of importance. The TX units of larger dimensions support higher transfer power and more electronic devices to be charged simultaneously. Various embodiments of the present disclosure are described below in more detail.

FIG. 1 illustrates an equivalent circuit of a wireless charging system, according to an embodiment of the present disclosure.

Referring to FIG. 1, an impedance matching circuit includes a TX unit 110 and an RX unit 120. An impedance matching circuit of the TX unit 110 is referred to as a first impedance matching circuit, and an impedance matching circuit of the RX unit 120 is referred to as a second impedance matching circuit.

According to an embodiment of the present disclosure, the TX unit 110 includes a power source 111, a TX coil 112 and a first impedance matching circuit 113. The power source 111 is connected to the TX coil 112 via the first impedance matching circuit 113. A current $I_{TX}$ generated by the power source 111 is transformed into a current $I_{TX\_COIL}$ by the first impedance matching circuit 113. The first impedance matching circuit 113 includes at least two series capacitors $2C_{1S}$. The first impedance matching circuit 113 also includes at least two capacitors $2C_{1P}$ connected in parallel to the TX coil 112. The capacitors $2C_{1P}$ connect the TX coil 112 with a ground 114 of the power source 111 and with a first shielding element 130. The capacitors $2C_{1P}$ are also referred to as shunt capacitors. The series capacitors $2C_{1S}$ connect the TX coil 112 with an output port of the power source 111.

The first impedance matching circuit 113 provides optimal impedance matching between the power source 111 and the TX coil 112. Although FIG. 1 illustrates only two capacitors $2C_{1S}$ and two capacitors $2C_{1P}$, it should be apparent to those skilled in the art that any number of capacitors can be used, depending on the particular application. The first shielding element 130 is arranged under the TX coil 112, and suppresses the electromagnetic radiation emitted by the TX coil 112 outside of an active charging area defined by the structure of the TX coil 112. The TX coil 112 and the first impedance matching circuit 113 together form a wireless charger 115.

According to an embodiment of the present disclosure, the RX unit 120 includes an RX coil 121, a second impedance matching circuit 122 and a load 123. The RX unit 120 may include a wireless power receiver including an RX coil 121 and a second impedance matching circuit 122, and a load 123. The wireless power receiver including the RX coil 121 and the second impedance matching circuit 122 is connectable to or separable from the load 123. For example, the wireless power receiver may be connected to the load 123 to charge the load 123.

In the RX unit 120, the RX coil 121 inductively couples to the TX coil 112, and the electromagnetic radiation emitted by the TX coil 112 induces charging currents in the RX coil 121. The RX coil 121 is connected to the load 123 via the second impedance matching circuit 122. The second impedance matching circuit 122 includes at least two series capacitors $2C_{2S}$ and at least two capacitors $2C_{2P}$ connected in parallel to the RX coil 121. The load 123 is charged by the charging currents. The parallel capacitors $2C_{2P}$ connect the RX coil 121 with a ground 124 of the load 123. The series capacitors $2C_{2S}$ connect the RX coil 121 with an output port of the load 123. The second impedance matching circuit 122 provides optimal impedance matching between the RX coil 121 and the load 123. Although FIG. 1 illustrates only two capacitors $2C_{2S}$ and two capacitors $2C_{2P}$, it should be apparent to those skilled in the art that any number of capacitors can be used, depending on the particular application.

According to an embodiment of the present disclosure, the first and second impedance matching circuits 113 and 122 provide resonance control between the TX coil 112 and the RX coil 121, thereby also maximizing the power transfer efficiency.

According to an embodiment of the present disclosure, the capacitors of the first impedance matching circuit 113 transform the impedance of the TX coil 112 according to the impedance of the load 123.

According to an embodiment of the present disclosure, the capacitors of the second impedance matching circuit 122 are selected in such a way as to transform the impedance of the RX coil 121 to an optimal impedance for the load 123.

According to an embodiment of the present disclosure, when the RX unit 120 is placed on the TX unit 110, the RX coil 121 and the TX coil 112 are coupled by a magnetic flux there between. As shown in FIG. 1, the magnetic flux generated by the TX coil 112 induces currents $I_{RX\_COIL}$ in the RX coil 121, and energy is transferred to the load 123.

According to an embodiment of the present disclosure, the first impedance matching circuit 113 of the TX unit 110 includes the at least two shunt capacitors $2C_{1P}$ connected in parallel to the TX coil 112 and the at least two series capacitors $2C_{1S}$ connecting the TX coil 112 to the output port of the power source 111. The shunt capacitors connect the TX coil 112 with the first shielding element 130 and with the ground 114 of the power source 111, thereby shunting in-phase currents flowing in the TX coil 112 to the first shielding element 130 and thus reducing electromagnetic interference (EMI) radiation emitted by the TX coil 112.

According to an embodiment of the present disclosure, the first shielding element 130 may be formed of a conductive material such as a copper material and/or a ferrite material.

According to an embodiment of the present disclosure, the capacitors $2C_{1P}$ in the first impedance matching circuit 113 of the TX coil 112 are connected in parallel to the TX coil 112 and connect the TX coil 112 to the first shielding element 130. Accordingly, in-phase currents can be shunted, thereby reducing parasitic EMI radiation. Due to the presence of the first shielding element 130, electromagnetic fields induced by currents in the TX coil 112 are suppressed at all points of space except the location of the RX unit 120. A resulting electromagnetic field therefore, is concentrated near the RX unit 120 and induces the currents in the RX coil 121 of the RX unit 120. The RX unit 120 can be located at any position and orientation within the active charging area of the TX unit 110. The TX coil 112 may emit uniform EMI radiation at any location within the active charging area. The active charging area is defined by the structure of the TX coil 112 and provides substantially constant impedance regardless of the position and orientation of the load 123 therein.

The TX coil 112 has a plurality of conductive turns separated from each other by gaps. The gaps decrease in the direction away from the center area of the TX coil 112.

According to an embodiment of the present disclosure, the TX coil 112 can have a helical form, but embodiments are not limited thereto, so that the gaps between the turns of the TX coil 112 decrease in the radial direction away from the center area of the TX coil 112.

According to an embodiment of the present disclosure, the turns of the TX coil 112 have maximum curvature radiuses at outer edges of the TX coil 112 and minimum curvature radiuses in the center area of the TX coil 112.

According to an embodiment of the present disclosure, the TX coil 112 can be a planar coil fabricated on a single-layered or multilayered printed circuit board (PCB). The planar coil can be made of sets of layers. Each layer within one set may have the same pattern of turns. All layers within one set may be mutually interconnected by a plurality of vias and configured as a solid conductive coil with a thickness equal to the thickness of the one set.

According to an embodiment of the present disclosure, the first impedance matching circuit 113 is balanced relative to the output port of the power source 111, and the center point of the first impedance matching circuit 113 is connected to the ground 114 of the power source 111.

According to an embodiment of the present disclosure, the active charging area defined by the TX coil 112, which is a wirelessly chargeable area, provides substantially constant impedance regardless of the position and orientation of the load 123 in the active charging area.

According to an embodiment of the present disclosure, the electromagnetic radiation emitted by the TX coil 112 is constant within the active charging area. The electromagnetic radiation emitted by the TX coil 112 is suppressed outside the active charging area.

The RX unit 120 can further comprise a rectifier connected to the output of the RX coil 121 and the second impedance matching circuit 122 before the load 123. The rectifier is configured to perform AC-to-DC transformation with respect to the currents induced in the RX coil 121.

In an embodiment of the present disclosure, the RX coil 121 has a plurality of conductive turns. Outer dimensions of the RX coil 121 are maximized within the available surface of the RX unit 120. The density and geometry of the turns depend on the geometry and power consumption of the RX unit 120.

In an embodiment of the present disclosure, the second impedance matching circuit 122 of the RX unit 120 includes the at least two capacitors $2C_{2P}$ connected in parallel to the RX coil 121, and the at least two series capacitors $2C_{2S}$ connecting the RX coil 121 with the load 123.

In an embodiment of the present disclosure, the wireless charging system including the TX unit 110 and the RX unit 120 operate in the frequency range from 100 kHz to 100 MHz, but embodiments are not limited thereto.

Figure 2:
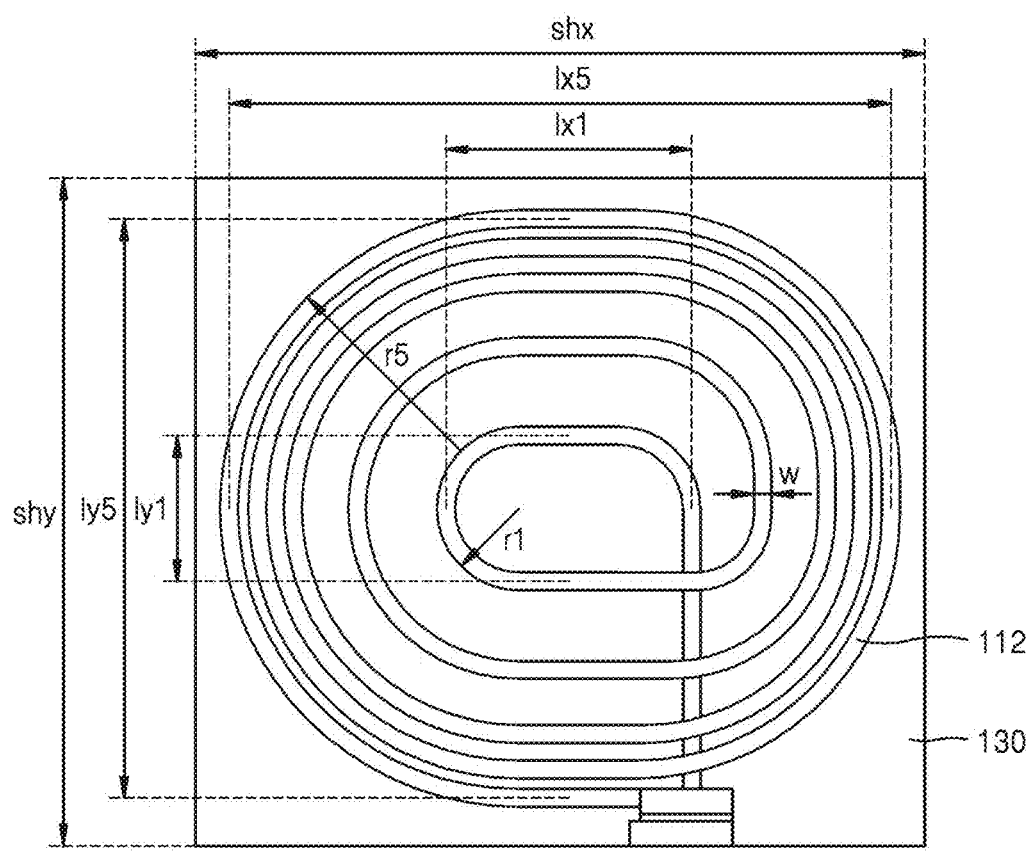
FIG. 2 illustrates a parametric model and dimensions of a transmitting (TX) coil and a first shielding element, according to an embodiment of the present disclosure.

FIG. 2 illustrates a parametric model and dimensions of a TX coil and a first shielding element, according to an embodiment of the present disclosure.

Referring to FIGS. 1 and 2, a constant power efficiency η and a constant input impedance $Z_{TX\_IN\_COIL}$ at various coupling conditions of the TX and RX coils is achievable if a coupling coefficient of coils k and Q-factors are invariant to the relative position of the RX unit 120 on the TX unit 110. The geometry of the TX coil 112 is described below in more detail.

In an embodiment of the present disclosure, the center of the conductive wire of the TX coil 112 shall be described by the following parametric models:

$$lx_i = lx_1 + (lx_N - lx_1)\left(\frac{i-1}{N-1}\right)^\alpha, \quad \text{Equation 1}$$
$$i = 1, 2, \ldots N$$

$$ly_i = ly_1 + (ly_N - ly_1)\left(\frac{i-1}{N-1}\right)^\alpha, \quad \text{Equation 2}$$

$$r_i = r_1 + (r_N - r_1)\left(\frac{i-1}{N-1}\right)^\alpha. \quad \text{Equation 3}$$

where $lx_N$, $ly_N$ and $lx_1$, $ly_1$ are outer and inner dimensions of the TX coil 112, respectively, N is a number of turns, $r_i$ is a curvature radius of an i-th coil wire, a is a parameter of a turn ratio, and w is a width of a coil wire. In FIG. 2, shx and shy describe a length and width, respectively, of the first shielding element 130. The dimensions of the TX coil 112, such as N, $lx_i$, $ly_i$ and $r_i$, are optimized with the criteria of maximum efficiency and uniformity for all possible positions of the RX unit 120. The dimensions and positions of the RX coil 121 are defined by geometrical limitations of the RX unit 120.

The presence of the first shielding element 130 and the RX unit 120 reduces the inductance of the TX coil 112. The first shielding element 130 gives insignificant impact to the losses, but eddy currents induced on the materials of the RX unit 120 dissipate energy. Therefore, the real environment of the TX unit 210 imposes significant restrictions to power transmitting efficiency (PTE).

Although the TX coil 112 has five conductive turns in FIG. 2, embodiments are not limited thereto, and the TX coil 112 may have less than or more than five conductive turns.

Figure 3:
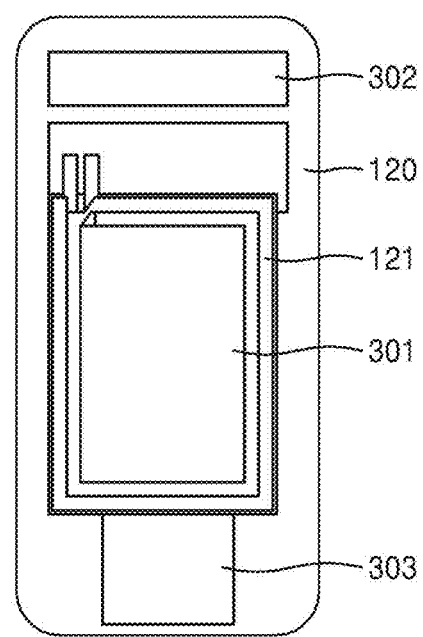
FIG. 3 illustrates a wireless power receiving unit (RX unit) and internal components thereof, according to an embodiment of the present disclosure.

FIG. 3 illustrates an RX unit and internal components thereof, according to an embodiment of the present disclosure.

Referring to FIG. 3, a second shielding element 301 may be installed under the RX coil 121 to isolate internal components 302 and 303 of an electronic device, within which the RX unit 120 is integrated, from electromagnetic radiation emitted by the TX coil 112 and the RX coil 121. For example, the internal components 302 and 303 of the electronic device may be isolated from the electromagnetic radiation emitted by the TX coil 112 and the RX coil 121 via the second shielding element 301.

In an embodiment of the present disclosure, the second shielding element 301 may be made of conductive materials such as copper materials and/or ferrite materials.

In an embodiment of the present disclosure, the internal components 302 and 303 of the electronic device may be isolated from the electromagnetic radiation emitted by the TX coil 112 and the RX coil 121, by existing conductive structures, for example, by the battery or battery pack.

Figure 4:
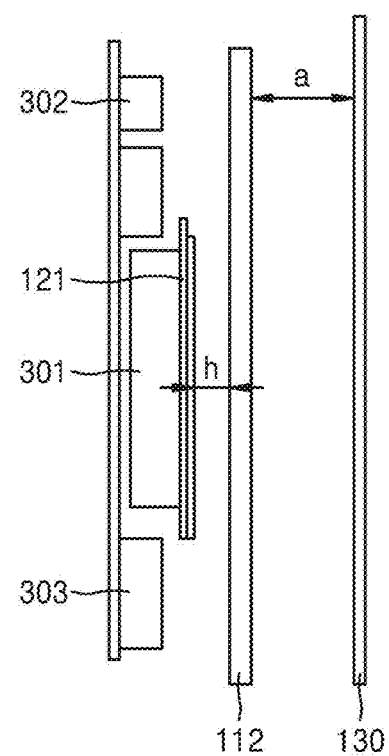
FIG. 4 is a side view illustrating a wireless charging system, according to an embodiment of the present disclosure.

FIG. 4 is a side view illustrating a wireless charging system, according to an embodiment of the present disclosure.

Referring to FIG. 4, "a" is a distance from the TX coil 112 to the first shielding element 130 and "h" is a distance from the RX coil 121 to the TX coil 112. The presence of the first shielding element 130 and the RX unit 120 reduces the inductance of the TX coil 112. As shown in FIG. 4, the second shielding element 301 of FIG. 3 is placed near the RX coil 121. FIG. 4 is roughly divided into three parts, which are a wireless charger including the TX coil 112 and the first shielding element 130, a wireless power receiver including the RX coil 121 and the second shielding element 301, and an electronic device including internal components 302 and 303 and a battery (not shown). The wireless charger, the wireless power receiver, and the electronic device are separate devices. To charge the battery of the electronic device, the electronic device may be connected to the wireless power receiver and mounted on the wireless charger.

FIGS. 5A and 5B illustrate a structure of a wireless charging system as viewed vertically and horizontally, when an RX unit is positioned on a TX unit, according to an embodiment of the present disclosure. FIG. 5B is a cross-section view taken along line A-A in FIG. 5A.

Referring to FIGS. 5A and 5B, components of the wireless charging system as viewed vertically correspond to those as viewed horizontally, respectively, for comparison. Although the number of conductive turns of the TX coil 112 is 5 in FIG. 5A, embodiments are not limited thereto, and the TX coil 112 may have more or less than 5 conductive turns. In the left view of FIG. 5B, a vertical direction length of the TX coil 112 and that of the RX unit 120 are similar to each other. However, a length and a width of the TX coil 112 may be greater than those of the RX unit 120.

Figure 6A:
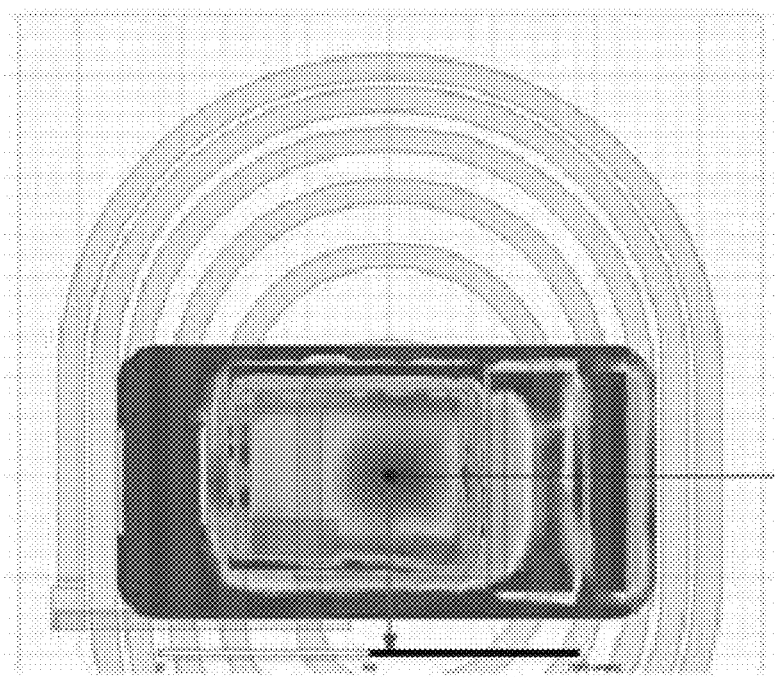
FIG. 6A illustrates a current distribution when an RX unit is placed in a center of a TX coil, according to an embodiment of the present disclosure.

FIG. 6A illustrates a current distribution over an RX unit when the RX unit is placed in a center of a TX coil, according to an embodiment of the present disclosure.

Figure 6B:
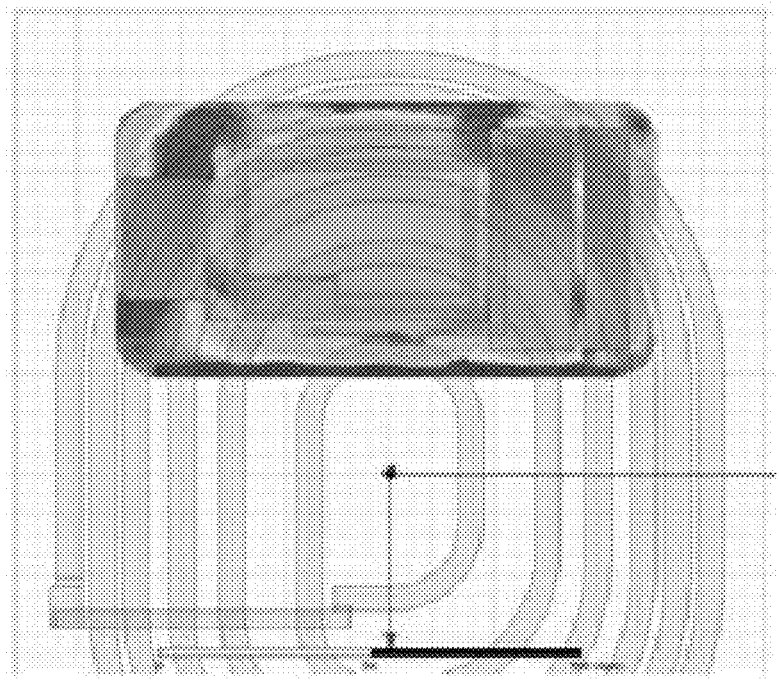
FIG. 6B illustrates a current distribution when an RX unit is placed in an edge of a TX coil, according to an embodiment of the present disclosure.

FIG. 6B illustrates a current distribution over an RX unit when the RX unit is placed in an edge of a TX coil, according to an embodiment of the present disclosure.

Referring to FIGS. 6A and 6B, the parameters of the TX coil 112 of the TX unit 110 may vary due to position change of the RX unit 120 relative to the TX coil 112. The dependence of the coupling coefficient k on the position of the RX unit 120 is defined by the design parameters $lx_i$, $ly_i$, and $r_i$ of the TX coil 112. Generally, the inductance and Q-factor of TX coil 112 increase as the RX unit 120 is shifted from the center position of the TX coil 112 to the edge position thereof. This is described by Lenz's law. Eddy currents on surfaces of the RX unit 120 compensate for a magnetic flux induced by the TX coil 112. These eddy currents flow over the conductive surfaces of the elements of the RX unit 120, including a battery, a main board, a frame, and so forth. Surface current distributions over the RX unit 120 are shown in FIGS. 6A and 6B for the typical positions such as where the RX unit 120 (which is integrated within the electronic device) is placed in the center of the TX coil 112 (as shown in FIG. 6A) and where the RX unit 120 is shifted from the center (as shown in FIG. 6B).

In FIGS. 6A and 6B, dark areas represent high density of surface current over the body of the RX unit 120, while light areas represent low density of surface current over the body of the RX unit 120. The variation of induced currents for various positions of the RX unit 120 is the reason for the variation of inductance of the TX coil 112 depending on different positions of the RX unit 120 on the TX coil 112. When the RX unit 120 is placed in a center portion of the TX coil 112, the magnetic field generated by the center portion of the TX coil 112 is mostly normal to surfaces of the RX unit 120. In this case, current distribution is symmetrical over edges of the RX unit 120.

At the edge portion of the TX coil 112, the magnetic field has a significant tangent component and a non-uniform normal component. When the RX unit 120 is placed near the edge of the TX coil 112, the main part of the magnetic flux is concentrated closer to the center of the TX coil 112, and an eddy current intensity becomes lower and asymmetrical. This current distribution produces a lower magnetic flux because the field component perpendicular (i.e., normal) to the plane of the RX unit 120 is concentrated at a smaller region than the above-described case where the RX unit 120 is placed in the center of the TX coil 112, and the inductance of the TX coil 112 is increased.

Figure 7A:
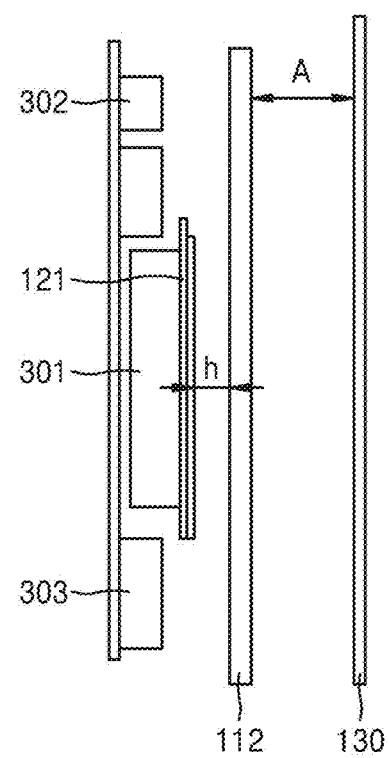
Figure 7B:
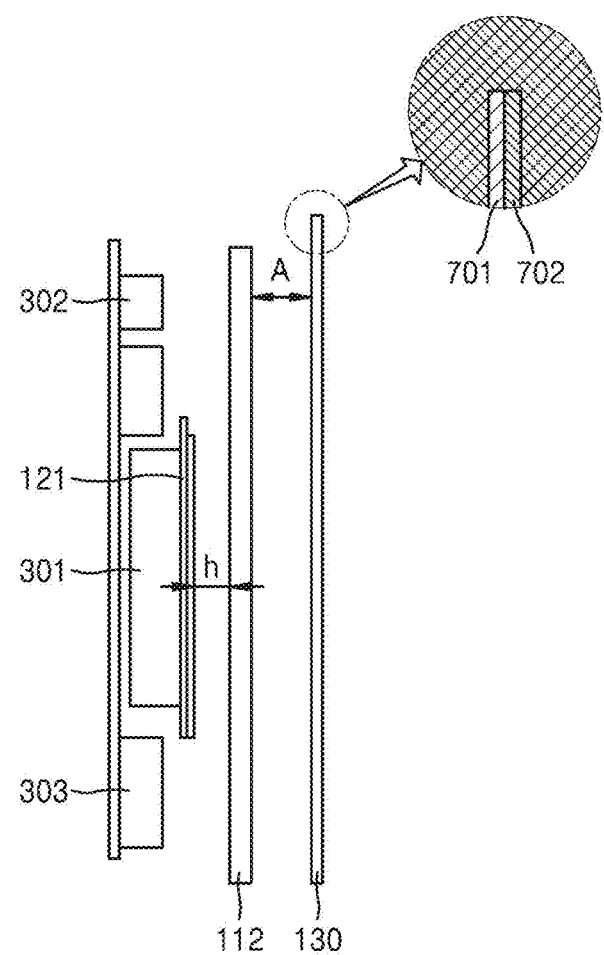

FIGS. 7A and 7B illustrate a method of reducing a total thickness of a TX unit, according to an embodiment of the present disclosure.

FIG. 7A illustrates the case when the first shielding element 130 is formed of a copper material, while FIG. 7B illustrates the case when the first shielding element 130 is formed of a copper material 701 and a ferrite material 702.

Referring to FIGS. 7A and 7B, the copper and ferrite materials provide better reduction of the total thickness of the TX unit. Further, it can be seen from FIG. 7B, that a distance A can be reduced in the case of using the copper and ferrite materials.

Requirements for isolation of the TX unit from surrounding objects are achieved by using various materials to form the first shielding element 130, as shown in FIGS. 7A and 7B. In particular, to reduce the total thickness of the TX unit, it is possible to use a thin-film ferrite shielding element instead of the conductive shielding element. For example, a ferrite layer with a thickness of 0.5 mm is sufficient for 20 dB shielding efficiency.

Variations in parameters for the TX unit 110 and the RX unit 112 according to variations of the first shielding element 130 are given in Table 1 below. According to the results of Table 1, the use of the ferrite and copper shielding element and the thin TX coil 112 (e.g., d=0.1 mm) may reduce the total thickness of the TX unit 110 to 5.7 mm Using the first shielding element 130 mounted at a small distance, e.g., A=5 mm, from the TX coil 112 and only formed of a copper material, leads to the decrease of self-inductance $L_1$ by 57% and coupling factor k by 40% in comparison with a non-shielding case. Using the first shielding element 130 mounted at a small distance, e.g., A=5 mm, from the TX coil 112 and formed of only a ferrite material, leads to the decrease of Q-factor by 24% in comparison with a non-shielding case. The reduction of a thickness "d" of the TX coil 112 from 2 mm to 0.1 mm does not affect the parameters. Using the first shielding element 130 formed of only a ferrite material achieves high performances of the wireless charging system, but the self-inductance of the TX coil 112 still affects external metal objects (e.g., a metal table). As described above, an appropriate shielding element needs to be designed in consideration of, for example, an influence on the parameters and the total thickness of the TX unit 110.

Figure 9A:
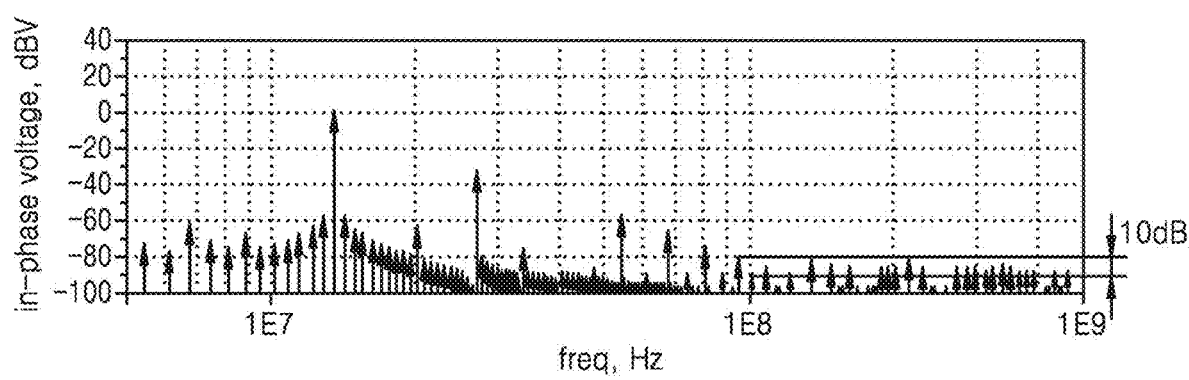
Figure 9B:
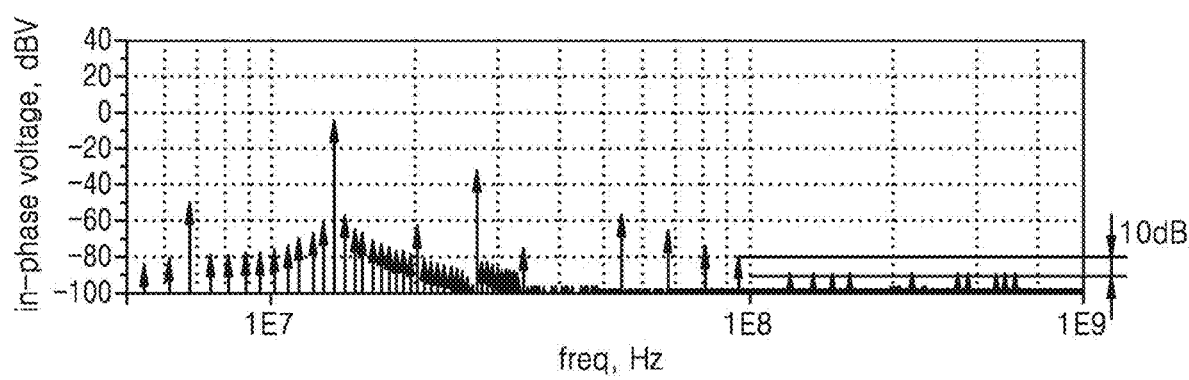

Referring to FIG. 9A, a case where the shunt capacitors $2C_{1P}$ are disconnected from the ground 114 of the power source 111 and from the first shielding element 130 is illustrated. Referring to FIG. 9B, a case where the shunt capacitors $2C_{1P}$ are connected to the ground 114 of the power source 111 and to the first shielding element 130 is illustrated. An influence of connection or disconnection of the shunt capacitors $2C_{1P}$ upon a phase noise reduction may be ascertained via a comparison between FIGS. 9A and 9B. As shown in FIG. 1, the TX coil 112 is connected to the ground 114 of the power source 111 and to the first shielding element 130 by using the shunt capacitors $2C_{1P}$. According to the results presented in FIGS. 9A and 9B, in doing so, the EMI noise is reduced by at least 10 dB in the frequency range above 90 MHz.

Figure 10A:
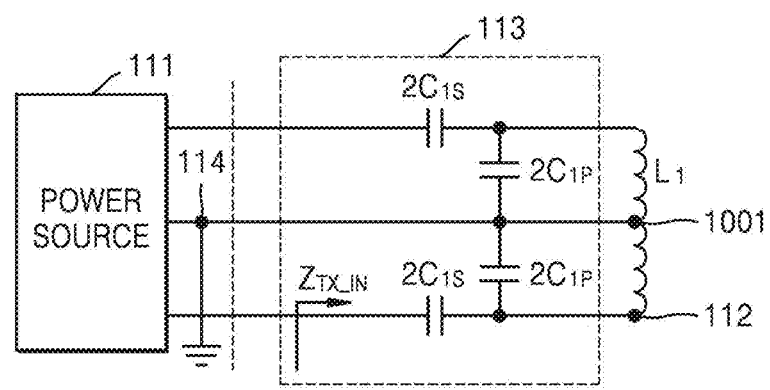
FIGS. 10A and 10B illustrate equivalent circuits showing a connection of a center tap of a TX coil to a ground of a power source, according to an embodiment of the present disclosure.
Figure 10B:
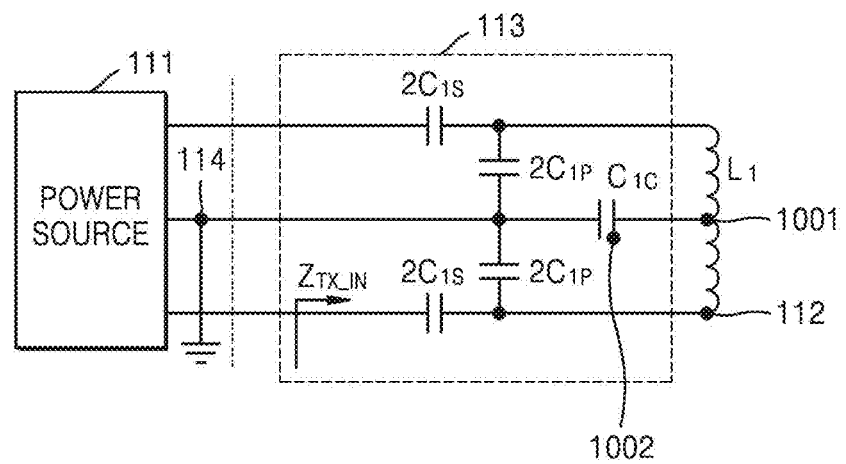

FIGS. 10A and 10B illustrate equivalent circuits showing a connection of a center tap of a TX coil to a ground of a power source, according to an embodiment of the present disclosure.

Referring to FIGS. 1 and 10A, a center tap 1001 of the TX coil 112 can be provided and is connected to the first shielding element 130. The first shielding element 130 is connected to the ground 114 of the power source 111. Thus, EMI radiation is reduced. Various methods of such connection are available, including galvanic connections as shown in FIG. 10A or capacitive connections as shown in FIG. 10B.

TABLE 1

Dependence of parameters of TX and RX units on first shielding-element variations

| Parameter name | No shielding for the TX coil | 0.1 mm copper shielding A = 10 mm d = 2 mm | 0.1 mm copper shielding A = 5 mm d = 2 mm | 1 mm ferrite shielding A = 5 mm d = 2 mm | 0.5 mm ferrite shielding A = 5 mm d = 2 mm | 0.5 mm ferrite shielding A = 5 mm d = 0.1 mm | 0.1 mm copper and 0.5 mm ferrite shielding A = 5 mm d = 0.1 mm |
|---|---|---|---|---|---|---|---|
| $L_1$, uH | 2.03 | 1.26 | 0.87 | 2.7 | 2.6 | 2.6 | 2.4 |
| $Q_1$ | 144 | 164 | 138 | 110 | 109 | 108 | 103 |
| k | 0.25 | 0.18 | 0.15 | 0.27 | 0.26 | 0.26 | 0.26 |
| U | 32.7 | 25.5 | 17.9 | 29.7 | 28.8 | 28.7 | 27.2 |

Figure 8B:
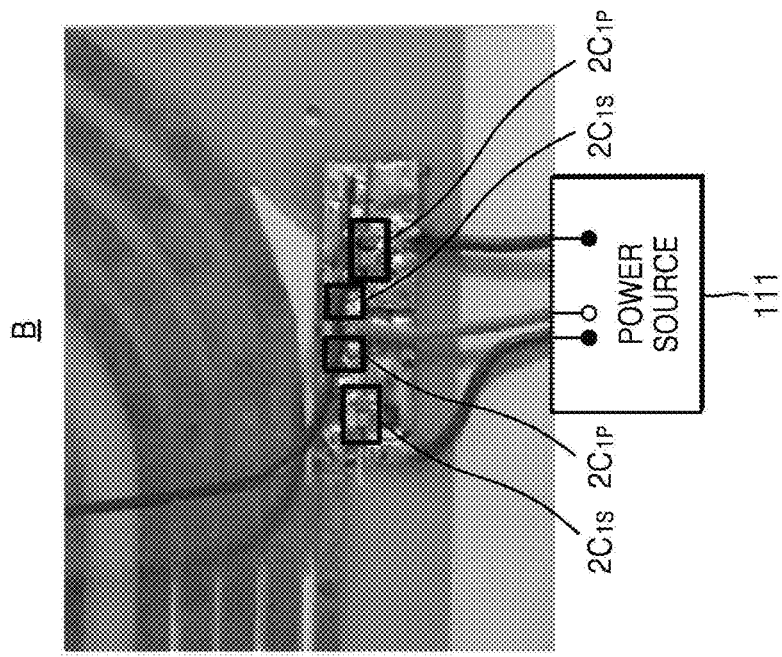
FIG. 8B illustrates a magnified view of positions where a TX coil is connected to a ground of a power source and to a first shielding element, according to an embodiment of the present disclosure.
Figure 8A:
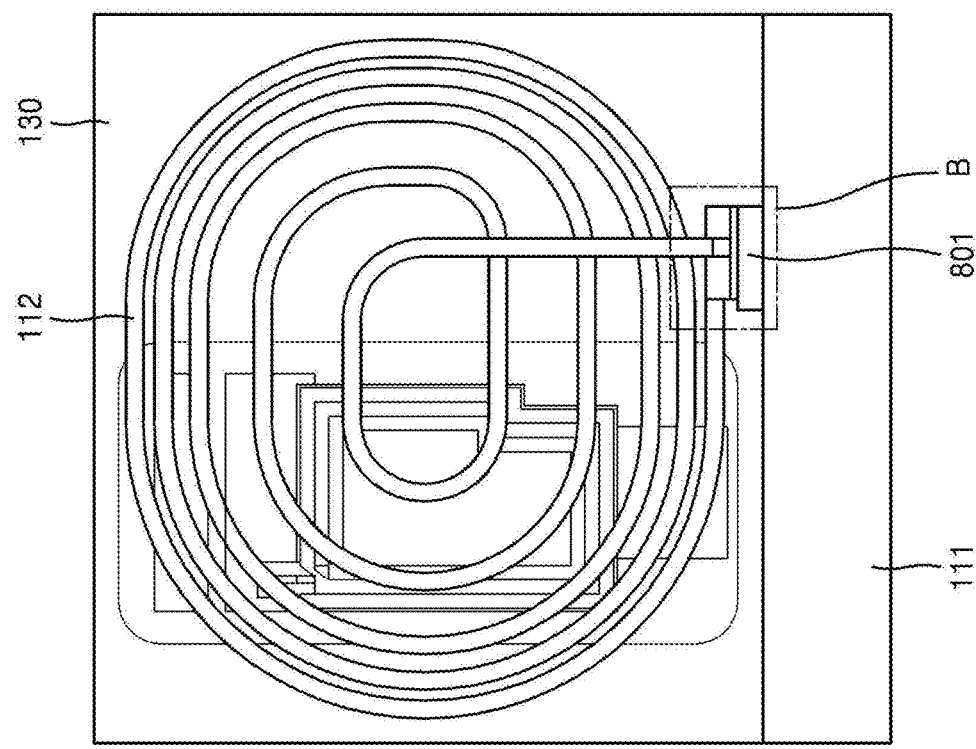
FIG. 8A illustrates connections of a TX coil to a ground of a power source and a first shielding element, according to an embodiment of the present disclosure.

FIG. 8A illustrates connections of a TX coil to a ground of a power source and a first shielding element, according to an embodiment of the present disclosure.

FIG. 8B illustrates a magnified view of positions where a TX coil is connected to a ground of a power source and to a first shielding element, according to an embodiment of the present disclosure.

Referring to FIG. 8A, the connection of the TX coil 112 to the ground of the power source 111 and to the first shielding element 130 is implemented using the first impedance matching circuit 113. The capacitors $2C_{1S}$ and $2C_{1P}$ of the first impedance matching circuit 113 are positioned at an area 801.

Referring to FIG. 8B, illustrating the magnified view B of positions where the TX coil 112 is connected to the ground of the power source 111 and the first shielding element 130, the TX coil 112 is connected to the ground of the power source 111 in parallel by using the capacitors $2C_{1P}$ and is serially connected to the power source 111 by using the capacitors $2C_{1S}$.

FIGS. 9A and 9B are graphs illustrating in-phase voltage spectrums for a TX coil according to connection or disconnection of the shunt capacitors to or from a ground of a power source and a first shielding element, according to an embodiment of the present disclosure.

Using these methods, the in-phase currents are shunted before entering the TX coil 112, and parasitic radiation emission in the TX coil 112 is attenuated. These methods do not affect the provision of differential output power from the power source 111 to the TX coil 112. Therefore, PTE is not degraded.

Referring to FIGS. 1 and 10B, the capacitive connection may be formed by lumped capacitor elements or by mutual capacitance between the center tap 1001 and the first shielding element 130, as indicated by $C_{1C}$ 1002.

According to an embodiment of the present disclosure, multiple connection taps between the TX coil 112 and the first shielding element 130 is formed via capacitive connections. The term "multiple connection taps" indicate the case where multiple taps are used. The TX coil 112 may include at least one tap, and may include a center tap.

Figure 11A:
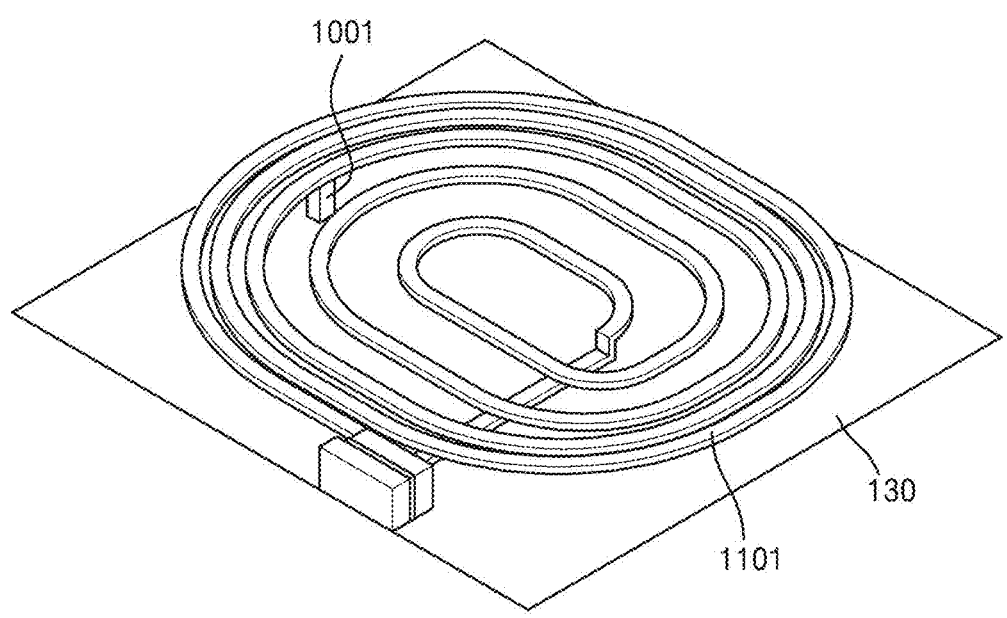
FIGS. 11A and 11B illustrate different types of structures of a TX coil, according to an embodiment of the present disclosure.
Figure 11B:
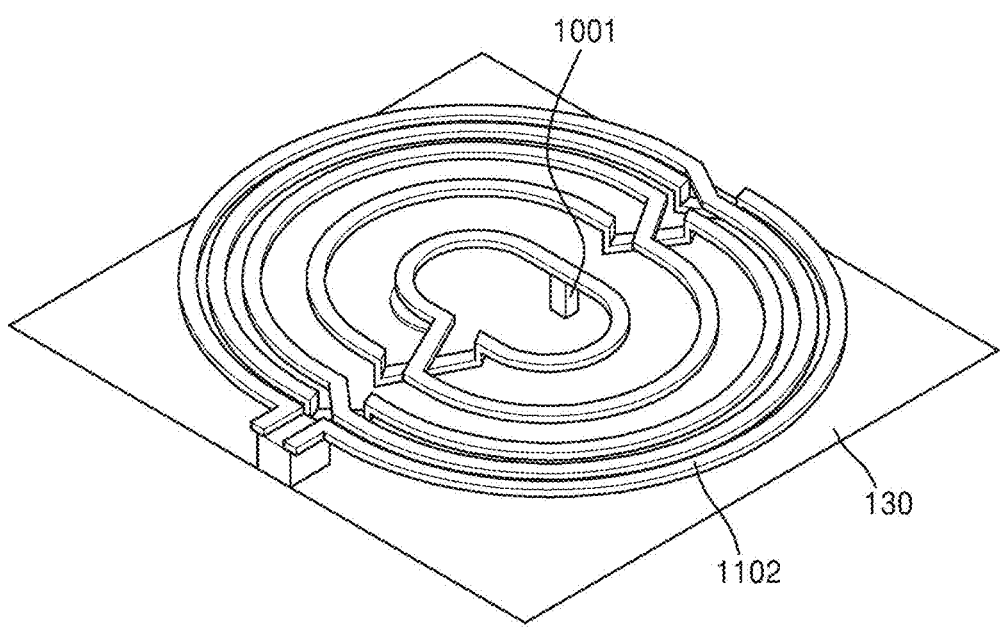

FIGS. 11A and 11B illustrate different types of structures of a TX coil, according to an embodiment of the present disclosure.

In FIG. 11A, the structure of the TX coil is an asymmetric spiral coil 1101. In FIG. 11B, the structure of the TX coil is a symmetric spiral coil 1102. In each case, the positions of one or more center taps 1001 are optimized for the amplitude and phase balance of voltages at the pins of the TX coil.

Referring to FIGS. 11A and 11B, EMI radiation is reduced due to the connection of the center tap 1001 of the TX coil 112 to the ground 114 of the power source 111 of FIG. 1.

Figure 12:
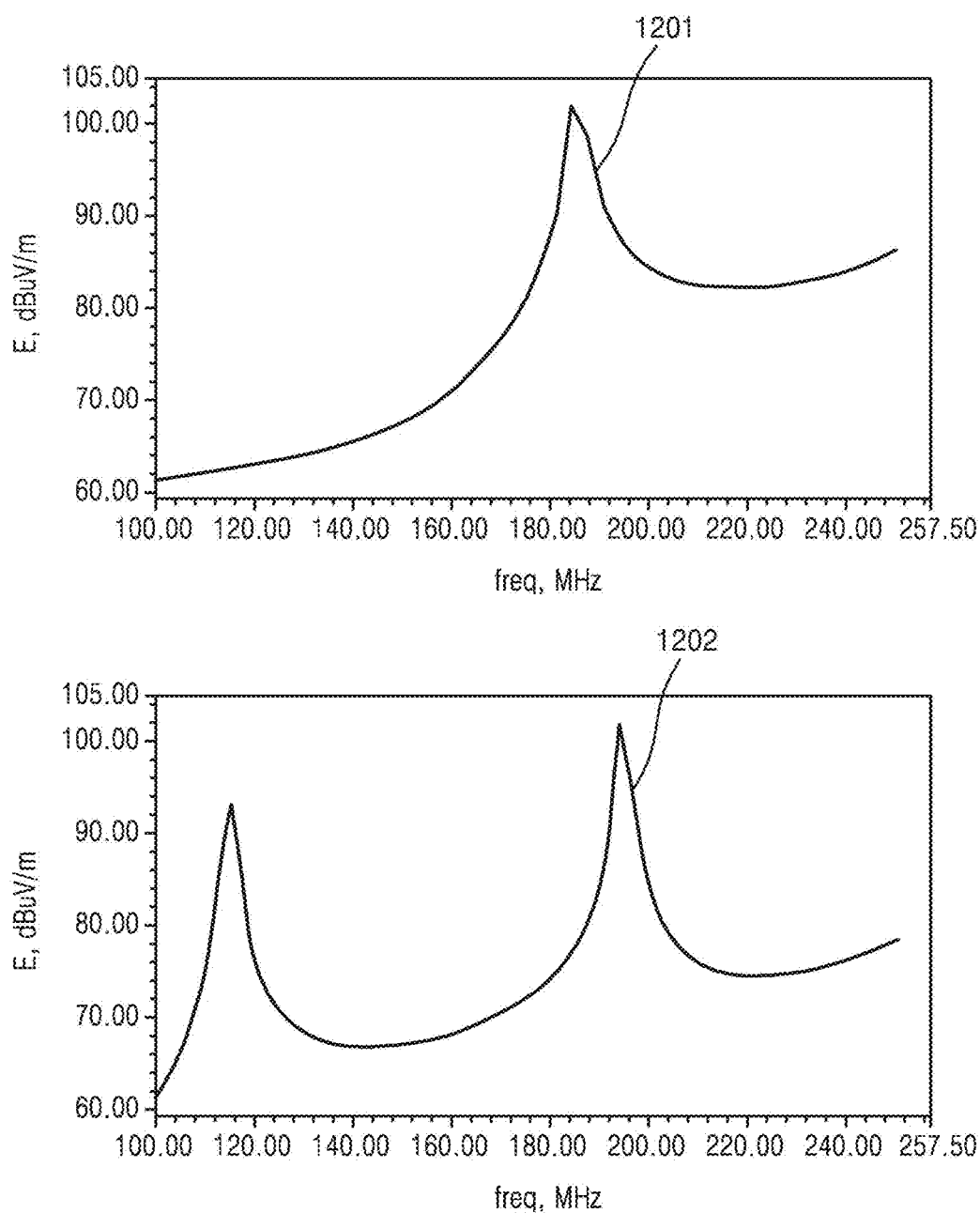
FIG. 12 are graphs illustrating electromagnetic interference (EMI) radiation level reduction by using a center-tapped TX coil, according to an embodiment of the present disclosure.

FIG. 12 are graphs illustrating EMI radiation level reduction by using a center-tapped TX coil, according to an embodiment of the present disclosure.

Referring to FIGS. 11A, 11B and 12, a curve 1201 indicates the case where the TX coil has no center tap 1001, and a curve 1202 indicates the case where the TX coil has the center tap 1001. The TX coil without the center tap has 2 peaks of radiated EMI, at 100-120 MHz and at 180-200 MHz as shown by the curve 1202 in FIG. 12. The TX coil with the connected center tap 1001 has only 1 peak at 180-200 MHz as shown by the curve 1201 in FIG. 12). Therefore, the center tap 1001 of the TX coil suppresses an EMI radiation level at 100-120 MHz by at least 40 dB.

Figure 13:
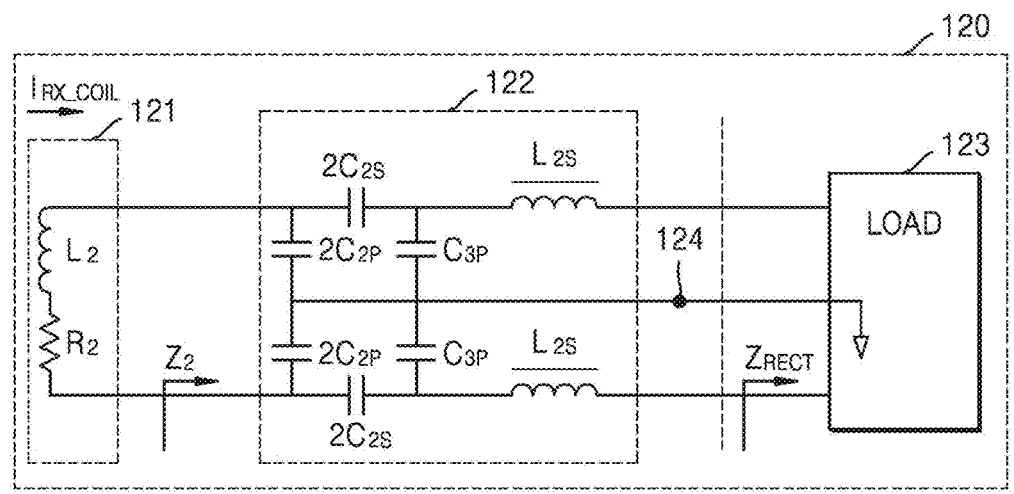
FIG. 13 illustrates an equivalent circuit of an RX unit in which capacitors are connected to a ground of a load, according to an embodiment of the present disclosure.

FIG. 13 illustrates an equivalent circuit of an RX unit in which capacitors are connected to a ground of the RX unit, according to an embodiment of the present disclosure.

Referring to FIG. 13, a method of EMI reduction for the RX unit 120 utilizes the connection of the capacitors $2C_{2P}$ to the ground 124 of the RX unit 120, as shown in FIG. 1. Further EMI reduction is achievable using shunt capacitors $C_{3P}$ and ferrite bead $L_{2S}$ connected as shown in FIG. 13.

Figure 14A:
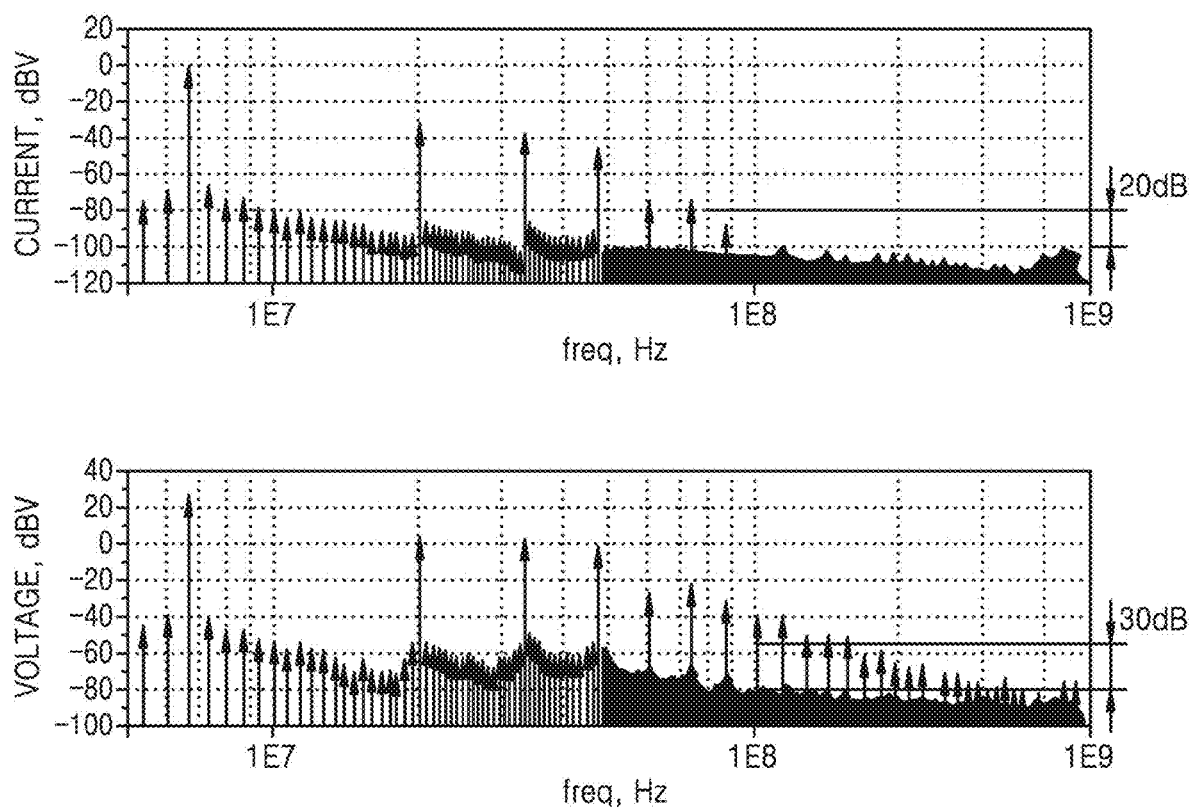
FIGS. 14A and 14B are graphs illustrating voltage and current spectrums on an RX coil, according to an embodiment of the present disclosure.
Figure 14B:
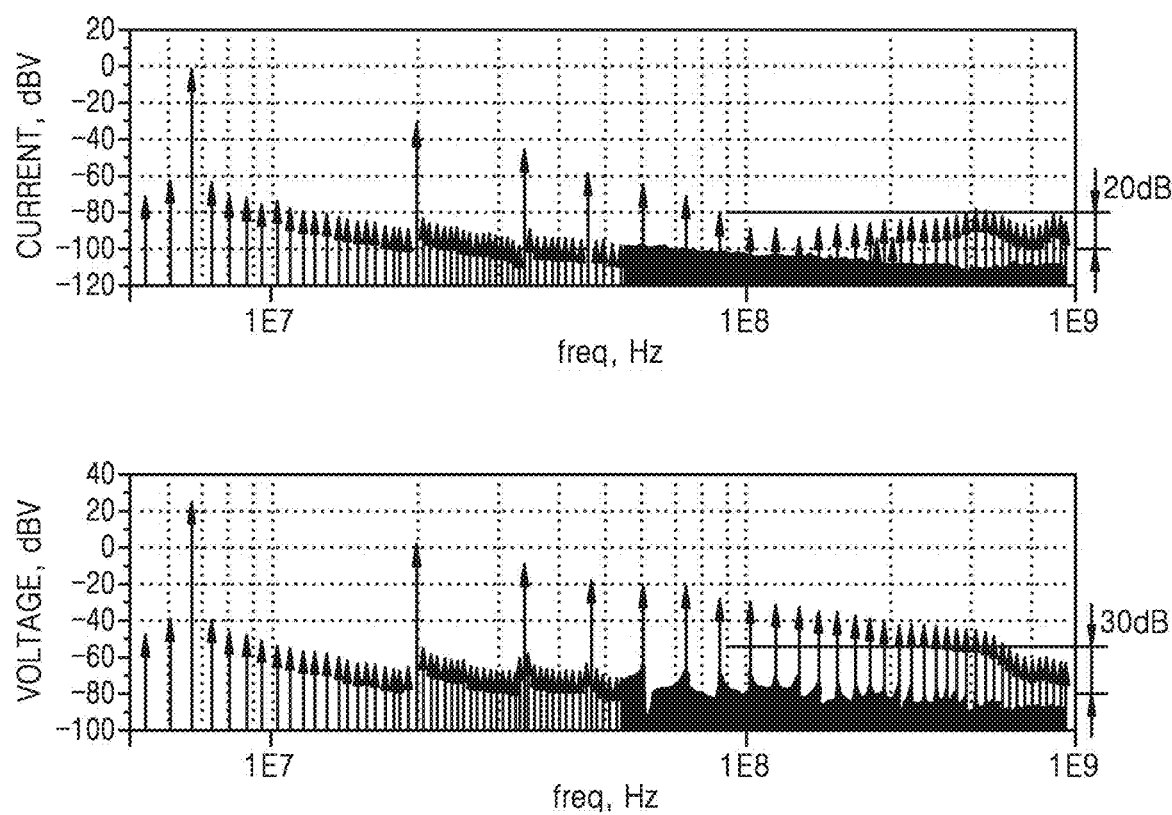

FIGS. 14A and 14B are graphs illustrating voltage and current spectrums of an RX coil, according to an embodiment of the present disclosure.

Referring to FIG. 14A, a case where the capacitors $2C_{2P}$ are disconnected from the ground 124 of the RX unit 120 is illustrated. Referring to FIG. 14B, a case where the capacitors $2C_{2P}$ and $C_{3P}$ and the ferrite bead $L_{2S}$ are connected to the ground 124 of the RX unit 120 is illustrated. The effect of the connection of the shunt capacitors $C_{3P}$ and the ferrite bead $L_{2S}$ on common mode noise reduction is shown in FIGS. 14A and 14B. According to the results presented on FIGS. 14A and 14B, the EMI noise spectrum is reduced by at least 20 dB at frequencies above 150 MHz and by at least 30 dB at 350-500 MHz.

Figure 15A:
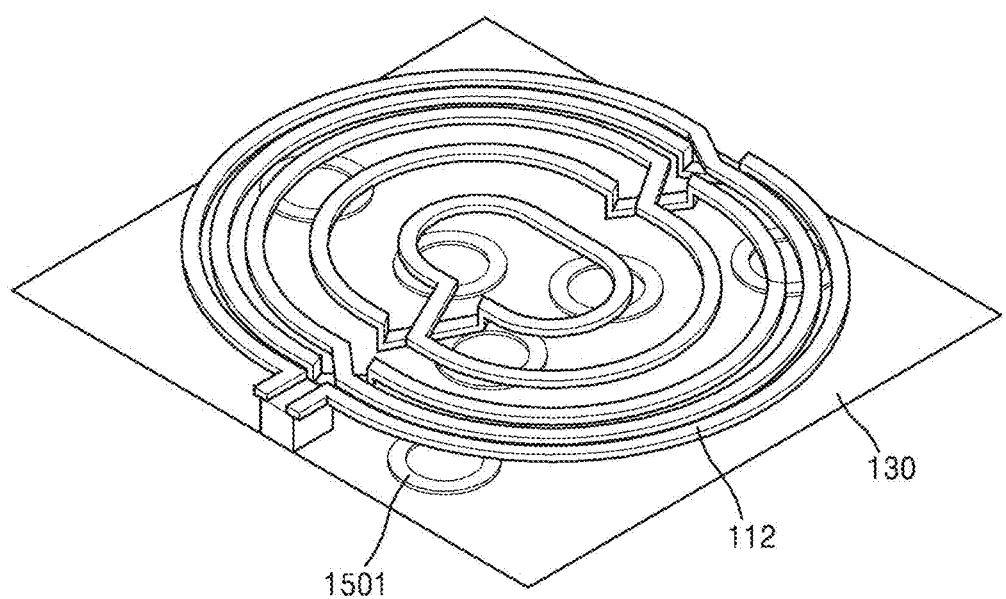
FIGS. 15A to 15C illustrate self-resonant absorbing elements located between a TX coil and a first shielding element to reduce EMI radiation, according to an embodiment of the present disclosure.
Figure 15B:
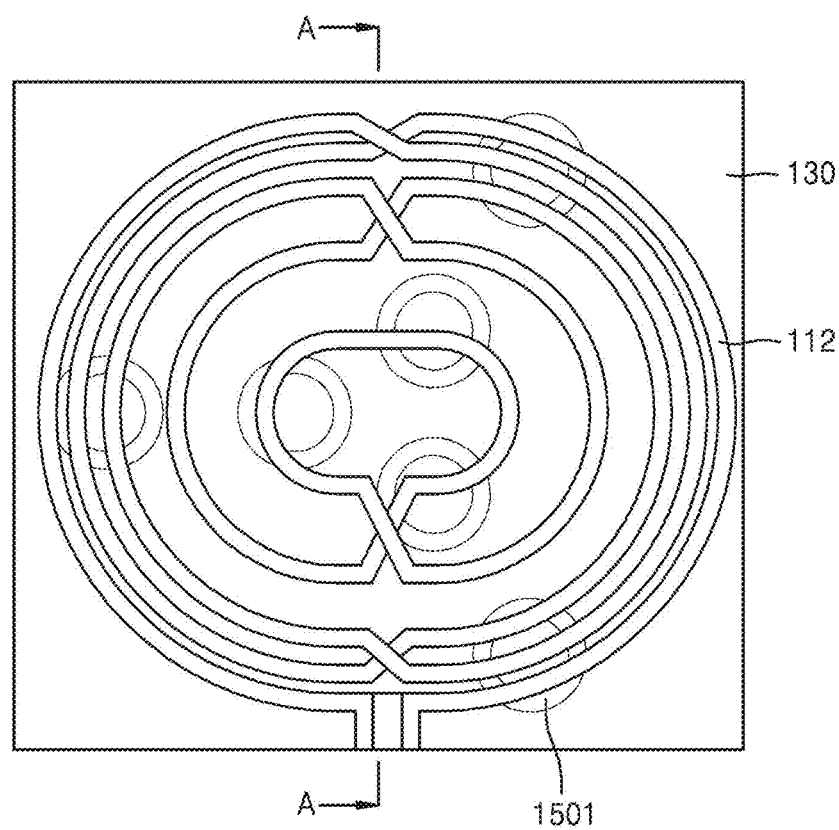
Figure 15C:
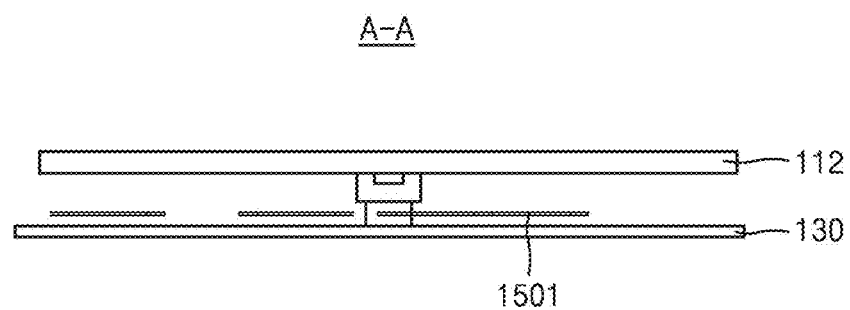

FIGS. 15A to 15C illustrate self-resonant absorbing elements located between a TX coil and a first shielding element to reduce EMI radiation, according to an embodiment of the present disclosure.

FIG. 15A is a perspective view, FIG. 15B is a top view, and FIG. 15C is a cross-section view taken along line A-A in FIG. 15B. The self-resonant absorbing elements 1501 suppress parasitic resonances of the TX coil 112 by absorbing all or some peaks of EMI radiation.

Figure 16:
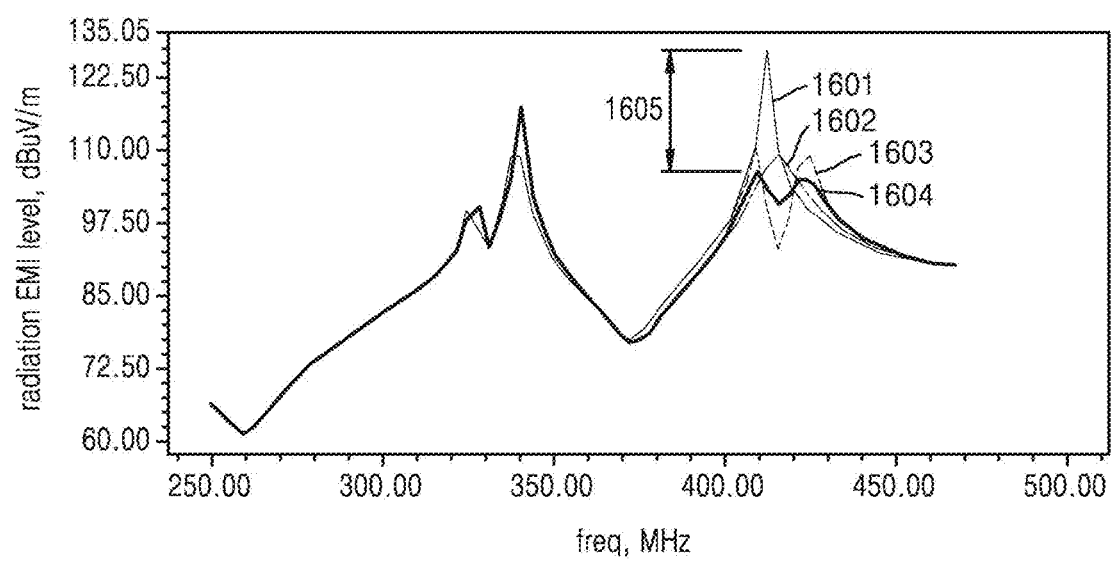
FIG. 16 is a graph illustrating EMI radiation when a TX unit includes self-resonant absorbing elements and EMI radiation when a TX unit includes no self-resonant absorbing elements, according to an embodiment of the present disclosure.

FIG. 16 is a graph illustrating EMI radiation when a TX unit includes self-resonant absorbing elements and EMI radiation when the TX unit includes no self-resonant absorbing elements, according to an embodiment of the present disclosure.

The effect of the self-resonant absorbing elements 1501 of FIGS. 15A to 15C on the EMI radiation level is illustrated in FIG. 16. The Q-factor of the self-resonant elements 1501 affects the efficiency of EMI radiation reduction. A curve 1601 indicates the TX unit without self-resonant absorbing elements 1501, a curve 1603 indicates an under-damping resonant structure, a curve 1602 indicates an over-damping resonant structure, and a curve 1604 indicates an optimally damping resonant structure. As shown in FIG. 16, the self-resonant absorbing elements 1501 tuned to 412 MHz applied to the curve 1601 suppress parasitic resonance by about 20 dB as indicated by a double arrow 1605.

Referring to FIGS. 15A to 15C, the TX unit 110 includes the self-resonant absorbing elements 1501 disposed under the TX coil 112 of FIG. 1, and may be used to reduce electromagnetic radiation emitted by the TX coil 112.

Resonant frequencies of the self-resonant absorbing elements 1501 are tuned to be equal to frequencies of the peaks of the electromagnetic radiation emitted by the TX coil 112, so that the self-resonant absorbing elements 1501 are configured to absorb the peaks of the electromagnetic radiation at these resonant frequencies, since the peaks of the electromagnetic radiation may have a negative influence on internal components of a charged electronic device. The self-resonant absorbing elements 1501 are made as split-ring resonators, complimentary split-ring resonators, resonant spirals, complimentary resonant spirals, or other types of metamaterial structures.

FIGS. 17A and 17B are graphs illustrating a dependence of an impedance of a TX unit for implementation of a hybrid impedance matching circuit, according to an embodiment of the present disclosure.

Referring to FIG. 17A, a maximum PTE for the inductively coupled TX coil 112 and RX coil 121 of FIG. 1 is achievable only with optimal load impedance. In order to analyze these parameters, it is necessary to consider two mutually coupled inductive coils with inductances $L_1$ and $L_2$, intrinsic loss $R_1$ and $R_2$, and mutual inductance M. The RX coil 121 is assumed to be connected to the load with complex impedance $Z_2$ as shown in FIG. 1. In other words, complex impedance when the RX coil 121 views the second impedance matching circuit 122 and the load 123 is $Z_2$. The optimal impedance matching $Z_2$ shall satisfy resonance conditions at the RX coil 121, and the maximum efficiency of power transfer is achieved at $Z_{2opt}$, where:

$$Z_{2opt} = R_2 \sqrt{1 + \frac{\omega^2 M^2}{R_1 R_2}} - j\omega L_2 \qquad \text{Equation 4}$$

The figure of merit U is used in the equations below for the sake of simplicity.

$$U = \frac{\omega M}{\sqrt{R_1 R_2}} = k\sqrt{Q_1 Q_2} \,; Q_1 = \omega L_1/R_1, Q_2 = \omega L_2/R_2 \qquad \text{Equation 5}$$

The inductive coupling coefficient of coils is $k = M/\sqrt{L_1 L_2}$.

In Equation 5, $\omega$ is a frequency at which the TX and RX units 110 and 120 operate.

The maximum efficiency of power transfer for optimal $Z_{2opt}$ expressed in Equation 4 is:

$$\eta_{max} = \frac{U^2}{\left(1 + \sqrt{1 + U^2}\right)^2}. \qquad \text{Equation 6}$$

The input impedance of the TX coil 112 in the case of optimal load is:

$$Z_{TX\_IN\_COIL} = R_1\sqrt{1 + U^2} + i\omega L_1. \qquad \text{Equation 7}$$

As the input impedance $Z_{TX\_IN\_COIL}$ and the load impedance $Z_2$ are defined by Equations 4 and 7, the first and second impedance matching circuits 113 and 122 are needed to match these impedances for the required power source 111 and the load 123, as shown in FIG. 1. The elements of the impedance matching circuit for the RX unit 120 should be calculated using rectifier input impedance $Z_{RECT}$ as follows:

$$\left(\frac{\operatorname{Re}(Z_{RECT})}{R_2\sqrt{1+U^2}} - 1\right)X^2 + \frac{2\omega L_2 \operatorname{Re}(Z_{RECT})}{R_2\sqrt{1+U^2}}X +$$

$$R_2\sqrt{1+U^2}\operatorname{Re}(Z_{RECT}) + \frac{\omega^2 L_2^2 \operatorname{Re}(Z_{RECT})}{R_2\sqrt{1+U^2}} = 0$$

Equation 8

$$Y = \left(\frac{\operatorname{Re}(Z_{RECT})}{\sqrt{1+U^2}\,R_2} - 1\right)X + \frac{\omega L_2 \operatorname{Re}(Z_{RECT})}{\sqrt{1+U^2}\,R_2} - \operatorname{Im}(Z_{RECT})$$

Equation 9 where $X = -1/\omega C_{2P}$ is an impedance of the capacitor $C_{2P}$ parallel to the RX coil 121, and $Y = -1/\omega C_{2S}$ is an impedance of the capacitor $C_{2S}$ serially connected with the load 123. The series element with a value from Equation 9 may be a capacitor or inductor. The existence of a negative root in Equation 8 defines the possibility to use the capacitor as a shunt element of the impedance matching circuit:

$$C_{2P} = -1/\omega X_{NEG}$$

where $X_{NEG}$ is the negative root of Equation 8. In the case where the derived Y value is negative, the series capacitor value is:

$$C_{2S} = -1/\omega Y$$

Applicability criteria for the hybrid parallel-series elements of the second impedance matching circuit 122 in the RX unit 120 is defined as:

$$R_2\sqrt{1+U^2} \leq \operatorname{Re}(Z_{RECT}) \leq$$

$$\sqrt{1+U^2}\,R_2 + \frac{\omega^2 L_2^2}{\sqrt{1+U^2}\,R_2}$$

Equation 10

The conditions, $$\operatorname{Re}(Z_{RECT})_{min} = R_2\sqrt{1+U^2}$$

may correspond to series impedance matching, i.e. $C_{2P}=0$. Otherwise, the hybrid parallel-series elements of the second impedance matching circuit 122 may be used.

The operation of the power source 111 is defined by the input impedance $Z_{TX}$ of the TX unit 110. The first impedance matching circuit 113 for the TX coil 112 should be calculated from the following equations:

$$\left(\frac{\operatorname{Re}(Z'_{TX\_IN})}{\sqrt{1+U^2}\,R_1} - 1\right)X^2 + \frac{2\omega L_1 \operatorname{Re}(Z'_{TX\_IN})}{\sqrt{1+U^2}\,R_1}X +$$

$$R_2\sqrt{1+U^2}\,R_1 + \frac{\omega^2 L_1^2 \operatorname{Re}(Z'_{TX\_IN})}{\sqrt{1+U^2}\,R_1}$$

Equation 11

$$Y = \left(\frac{\operatorname{Re}(Z'_{TX\_IN})}{\sqrt{1+U^2}\,R_1} - 1\right)X + \frac{\omega L_1 \operatorname{Re}(Z'_{TX\_IN})}{\sqrt{1+U^2}\,R_1} - \operatorname{Im}(Z'_{TX\_IN})$$

Equation 12

$$\operatorname{Re}(Z'_{TX\_IN}) < \sqrt{1+U^2}\,R_1 + \frac{\omega^2 L_1^2}{\sqrt{1+U^2}\,R_1}.$$

Equation 13

Here, X is a reactive component of an element parallel to the TX coil 112, and Y is a reactive component of an element serially connected with the power source 111. The sign of a root in Equation 11 defines a parallel element type, a capacitor or inductor. A series element with a value from Equation 12 may also be a capacitor or inductor. The existence of the negative root defines the possibility to use the capacitor as the parallel element of the first impedance matching circuit 113, such that:

$$\frac{1}{\omega C_{1P}} = -X_{NEG}$$

where $X_{NEG}$ is the negative root of Equation 11. In the case where the derived Y value is negative, the series capacitor value may be calculated using the following formula:

$$\frac{1}{\omega C_{1S}} = -Y$$

Equation 13 provides maximum $\operatorname{Re}(Z_{TX\_IN'})$ which may be matched with the particular TX coil 112.

According to an embodiment of the present disclosure, the real part of $Z_{TX\_IN}$ is inversely related to the impedance $Z_{RECT}$ of the load 123. An increase in $Z_{RECT}$ may cause a decrease in $Z_{TX\_IN}$. A decrease in $Z_{RECT}$ may cause an increase in $Z_{TX\_IN}$. Required Z-change is achieved when the first impedance matching circuit 113 of the TX unit 110 operates close to the series resonance:

$$f \ll \frac{1}{2\pi\sqrt{L_1 C_{1P}}},$$

$$\omega C_{1P} \ll \frac{1}{R_1(1+U^2)}$$

In that case, the real part of the impedance $Z_{TX\_IN}$ decreases with an increase in:

$$R_{RECT}: \operatorname{Re}(Z_{TX}|_{R_{RECT}=0}) > \operatorname{Re}(Z_{TX}|_{R_{RECT}=\infty})$$

Equation 14

The dependence of the input impedance $Z_{TX\_IN}$ of the TX unit 110 on $Z_{RECT}$ is shown in FIGS. 17A and 17B for the following two cases. FIG. 17A illustrates a correct implementation of the hybrid impedance matching circuit 113, and FIG. 17B illustrates an incorrect implementation of the hybrid impedance matching circuit.

Referring to FIG. 17A, when the first impedance matching circuit 113 operates correctly, a $Z_{TX\_IN}$ change has a nearly horizontal curve 1701 on a Smith-chart. Since a decrease in the impedance $Z_{TX\_IN}$ with an increase in $R_{RECT}$ is shown as a curve 1702 of FIG. 17A, the following:

$$\operatorname{Re}(Z_{TX}|_{R_{RECT}=0}) > \operatorname{Re}(Z_{TX}|_{R_{RECT}=\infty})$$

is satisfied as described above.

Referring to FIG. 17B, when the first impedance matching circuit 113 operates incorrectly, a $Z_{TX\_IN}$ change has a nearly vertical curve 1703 on the Smith-chart. Since an increase and then a decrease in the impedance $Z_{TX\_IN}$ with an increase in $R_{RECT}$ is shown as a curve 1704 of FIG. 17B, the following:

$$\operatorname{Re}(Z_{TX}|_{R_{RECT}=0}) > \operatorname{Re}(Z_{TX}|_{R_{RECT}=\infty})$$

is not satisfied as described above. In other words, the real part of the impedance $Z_{TX\_IN}$ has non-uniform dependence on the increasing $R_{RECT}$.

FIGS. 18A to 18F illustrate experimental results for prototypes of a TX unit and an RX unit according to locations of the RX unit, according to an embodiment of the present disclosure.

Figure 18A:
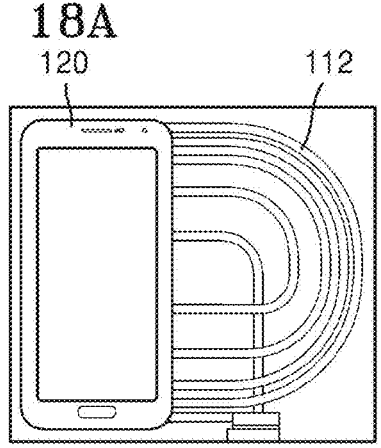
FIGS. 18A to 18F illustrate experimental results for prototypes of a TX unit and an RX unit according to locations of the RX unit, according to an embodiment of the present disclosure.
Figure 18B:
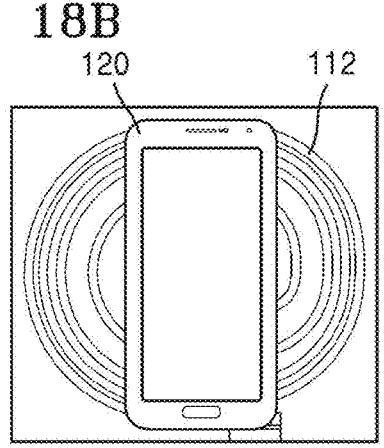
Figure 18C:
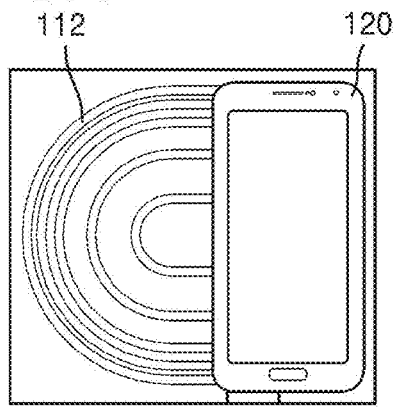
Figure 18D:
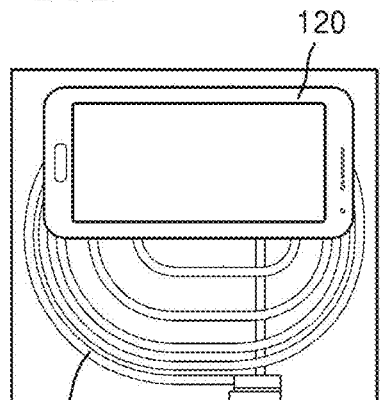
Figure 18E:
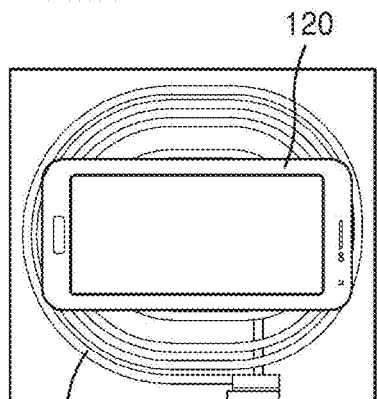
Figure 18F:
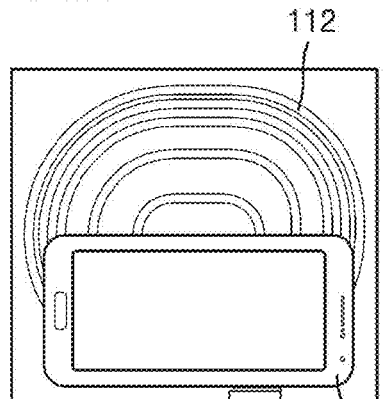

Referring to FIGS. 18A to 18F, according to the test results, a maximum PTE of the TX coil 112 of FIG. 1 is 90% and a PTE thereof is greater than 84%, for all positions and orientation of the RX unit 120 within an active charging area. When a mobile device is positioned vertically as shown in FIGS. 18A to 18C, a dX position is from −37 mm to +37 mm. When the mobile device is positioned horizontally as shown in FIGS. 18D to 18F, a dY position is from −30 mm to +30 mm Here, $$VSWR = \frac{1 + |\Gamma|}{1 - \Gamma}$$

is a voltage standing wave ratio, and a reflection coefficient $\Gamma$ is defined as Equation 15 by using $Z_{TX\_IN}$.

Analytical solutions for optimum impedance matching circuits in Equations 8, 9, 10, and 11 provide ideal matching and maximum power transfer efficiency. However, changes in coil parameters vary impedance matching and efficiency for various positions of the mobile device.

Matching and efficiency levels over all possible positions of the RX unit 120 may be estimated using a reflection coefficient $\Gamma$ as a measure of $Z_{TX\_IN}$ deviation from an optimal value. The reflection coefficient $\Gamma$ can be calculated using:

$$\Gamma = \frac{Z'_{TX\_IN} - Z_{TX\_IN}}{Z_{TX\_IN} + Z'_{TX\_IN}} \quad \text{Equation 15}$$

Quantitative estimation for the acceptable level of the variation of the parameters of the TX coil 112 is done using a sensitivity analysis of circuit input impedance to the change of coil parameters. The reflection coefficient variation is defined as:

$$\delta|\Gamma| = \frac{1}{2(R_1 + \text{Re}(Z_{IND}))} \sqrt{(\delta R_1 + \delta \text{Re} Z_{IND})^2 + (\delta(\omega L_1) + \delta \text{Im} Z_{IND})^2}, \quad \text{Equation 16}$$

where $Z_{IND}$—is the impedance induced by the RX coil 121:

$$Z_{IND} = \frac{\omega^2 M^2}{j\omega L_2 + R_2 + Z_2} \quad \text{Equation 17}$$

The variation is considered as a small deviation from optimal matching and maximum PTE:

$$\delta|\Gamma| = \frac{1}{2} \sqrt{\left(\frac{\delta R_1 + \delta \text{Re} Z_{IND}}{R_1 + \text{Re} Z_{IND}}\right)^2 + \frac{Q_1}{k^2 Q_2} \left(\frac{\delta(\omega L_1) + \delta \text{Im} Z_{IND}}{\omega L_1 + \text{Im} Z_{IND}}\right)^2} \quad \text{Equation 18}$$

The variation of a real part $R_1 + \text{Re} Z_{IND}$ of the impedance of the TX coil 112 is directly included in Equation 18, while the variation of an imaginary part $\omega L_1 + \text{Im} Z_{IND}$ is included together with a coefficient $Q_1/k^2 Q_2$ and is dependent on the parameters of the TX and RX coils 112 and 121.

When the RX coil 121 is matched as defined by Equations 8 and 9 and the load is constant ($Z_{RECT}$=const), the parameters of the RX coil 121 have very small variations and the variation in the resistance of the TX coil 112 is negligible:

$$Z_{IND} = \frac{\omega^2 M^2}{j\omega L_2 + R_2 + Z_2} = R_1 \frac{U^2}{\left(1 + \sqrt{1 + U^2}\right)} \approx R_1 U \quad \text{Equation 19}$$

$$\text{Im } Z_{IND} \approx 0$$

for all positions of RX coil

In this case, the reflection coefficient variation defined by Equation (18) may be simplified to:

$$\delta|\Gamma| = \frac{1}{2} \sqrt{\left(\frac{\delta k}{k}\right)^2 + \frac{Q_1}{k^2 Q_2} \left(\frac{\delta L_1}{L_1}\right)^2} \quad \text{Equation 20}$$

As a result, a low coupling factor (k<0.1) causes high sensitivity to inductance variations of the TX coil 112.

Figure 19:
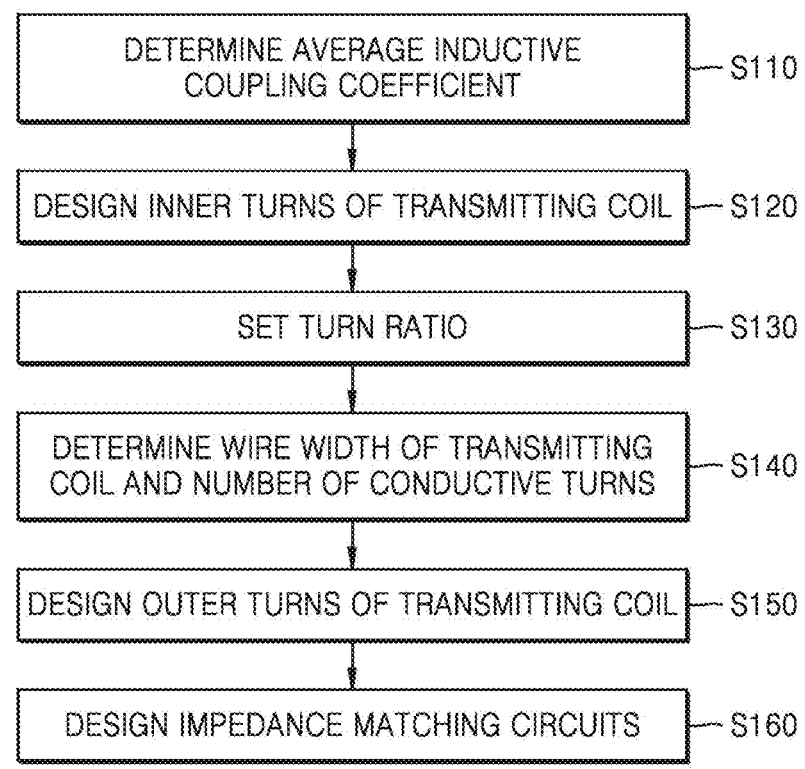
FIG. 19 is a flowchart of a method of designing a TX unit, according to an embodiment of the present disclosure.

FIG. 19 is a flowchart of a method of designing a TX unit, according to an embodiment of the present disclosure.

Methods based on the increase of inductive coupling and Q-factors may be applied for the improvement of PTE. In this process, the design of the TX coil 112 is a tradeoff between inductive coupling uniformity and inductance variation during the change of the position of the RX unit 120 relative to the TX coil 112. Thus, a criterion of a design evaluation of the TX coil 112 is based on PTE, and the variation of the input impedance of the TX coil 112 depending on the position of the RX unit 120 and depending on the load impedance $Z_{RECT}$.

Referring to FIG. 19, in operation S110, an average inductive coupling coefficient is estimated as, $$k_{mean} = \frac{\beta S_{RX}}{S_{TX}}$$

which is a ratio of a surface area $S_{RX}$ of the RX coil 121 to a surface area $S_{TX}$ of the TX coil 112, where $\beta$ is a parameter that may have a value between 0.8 and 0.9. The parameter defines the degradation of mutual inductance between the TX and RX coils 112 and 121 due to the presence of the first shielding element 130 and the RX unit 120.

In operation S120, the inner turns of the TX coil 112 are designed to provide the minimal variation of the inductance $L_1$ of the TX coil 112 when the RX unit 120 is placed in the center of the active charging area and rotated around the center of the RX unit 120. The unequal length and width of the active charging area and the asymmetry of the RX coil 121 provide unavoidable variations of the coupling factor. These variations are minimized by tuning dimensions $lx_1$ and $ly_1$ of the internal turns.

In operation S130, a turn ratio is set. Uniform coupling and constant input impedance of the TX coil 112 need to be achieved when the RX unit 120 is positioned within a certain distance from the center of the active charging area. The outer turns of the TX coil 112 need to be placed as close to each other as possible to provide minimal inductance variations at the edges of possible positions for the RX unit 120. In the aforementioned parametric model of the TX coil 112, uniformity is defined by a turn ratio α. An optimal turn ratio α is 0.55.

In operation S140, a wire width of the TX coil 112 and the number of conductive turns N thereof are determined. The wire width of the TX coil 112 and the number of conductive turns N thereof may be optimized based on the following considerations. Increasing the number of conductive turns N enables high coupling uniformity to be maintained when the RX unit 120 is at various positions, but the number of conductive turns N is limited by the minimum coil wire width. Decreasing the line width decreases the average coupling factor and $Q_1$, thus reducing maximum efficiency. Increasing the coil widths improves $Q_1$, but increases the variation of the inductance of the TX coil 112 when the RX unit 120 is placed close to the edges of the active charging area. Resistive loss reduction of the TX coil 112 due to an increase in the wire width is relatively small, and thus the Q-factor does not depend on the wire width. This phenomenon is connected with a non-uniform current distribution over the wire surface and a maximum current flow on wire edges. Mutual inductance between the TX coil 112 and the RX coil 121 is invariant to the wire width. As a result, efficiency increases according to Equation 5 due to a decrease in resistance of the TX coil 112.

In operation S150, the outer turns of the TX coil 112 are designed. The outer turns of the TX coil 112 need to be rounded with the greatest possible curvature radius to increase the average coupling coefficient. For example, referring to FIG. 2, the greatest possible rounded turns provide k=0.157. Corners rounded with $r_1=r_N$=15 mm cause the coupling to decrease to k=0.129.

In operation S160, impedance matching circuits are designed. Optimal impedance matching circuits may be calculated using Equations 8, 9, 10, and 11. The calculated first and second impedance matching circuits 113 and 122 provide optimum matching and maximum PTE. Finally, the effect of impedance matching and PTE variations due to the variation of the position of the RX unit 120 may be estimated from Equation 18.

According to the present disclosure, the electromagnetic radiation is suppressed outside the active charging area of a wireless charger, and parasitic radiation emission by a TX coil is minimized and does not interfere with electronic devices. Maximum power transfer efficiency is provided even when multiple mobile devices are located at any position and orientation.

The present disclosure achieves the objects of wireless charging systems, such as spatial and positional freedom and various charging environments. Disclosed designs of the resonators provide an ergonomic solution for charging all wearable devices at home or in an office, and wireless power stations for public areas like restaurants, coffee shops, libraries, and so forth.

According to an embodiment of the present disclosure, highly efficient wireless charging is provided for a plurality of mobile and/or wearable devices including smartphones, smart watches, smart glasses, tablet computers, and notebooks.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A wireless charger, comprising:
   a transmitting coil;
   a shielding element formed of a conductive material; and
   an impedance matching circuit configured to connect a power source to the transmitting coil,
   wherein the impedance matching circuit comprises:
   at least two capacitors each having a first end connected to the transmitting coil in parallel and a second end connected to each other, wherein each of the at least two capacitors connects a different tap of the transmitting coil to a ground of the power source and to the shielding element; and
   a third capacitor having a first end and a second end, wherein the first end of the third capacitor is connected to a center tap of the transmitting coil and the second end of the third capacitor is connected to the ground of the power source and each second end of the at least two capacitors, and
   wherein the at least two capacitors and the third capacitor are configured to shunt in-phase currents that flow into the transmitting coil and thereby reduce electromagnetic emissions.

2. The wireless charger of claim 1, wherein at least one tap of the transmitting coil is connected to the shielding element and to the ground of the power source via a capacitive connection.

3. The wireless charger of claim 2, wherein the capacitive connection is formed by lumped capacitor elements or by mutual capacitance between the at least one tap and the shielding element.

4. The wireless charger of claim 1, further comprising self-resonant absorbing elements placed between the transmitting coil and the shielding element.

5. The wireless charger of claim 4, wherein resonant frequencies of the self-resonant absorbing elements are tuned to be equal to frequencies of peaks of electromagnetic radiation emitted by the transmitting coil.

6. The wireless charger of claim 1, wherein the shielding element is made of at least one of a copper material or a ferrite material.

7. The wireless charger of claim 1, wherein gaps between conductive turns of the transmitting coil decrease in a direction away from a center area of the transmitting coil.

8. The wireless charger of claim 1, wherein turns of the transmitting coil have maximum curvature radiuses at outer edges of the transmitting coil and minimum curvature radiuses in a center area of the transmitting coil.

9. A wireless charging system, comprising:
   a wireless power transmitting unit comprising:
   a transmitting coil,
   a power source,
   a shielding element, and
   a first impedance matching circuit configured to connect the transmitting coil to the power source,
   wherein the first impedance matching circuit comprises at least two capacitors each having a first end connected to the transmitting coil in parallel and a second end connected to each other, wherein each of the at least two capacitors connects a different tap of the transmitting coil to a ground of the power source and to the shielding element,
   wherein the first impedance matching circuit further comprises a third capacitor having a first end and a second end, wherein the first end of the third capacitor is connected to a center tap of the transmitting coil and the second end of the third capacitor is connected to the ground of the power source and each second end of the at least two capacitors, and wherein the at least two capacitors and the third capacitor are configured to shunt in-phase currents that flow into the transmitting coil and thereby reduce electromagnetic emissions; and a wireless power receiving unit comprising:

a rectifier which is connectable to a battery, a receiving coil, a load, and a second impedance matching circuit configured to connect the receiving coil to the rectifier, wherein the second impedance matching circuit comprises at least two receiving unit capacitors which are connected to the receiving coil in parallel and connect the receiving coil to a ground of the battery.

10. The wireless charging system of claim 9, wherein at least one tap of the transmitting coil is connected to the shielding element and to the ground of the power source via a capacitive connection.

11. The wireless charging system of claim 10, wherein the capacitive connection is formed by lumped capacitor elements or by mutual capacitance between the at least one tap and the shielding element.

12. The wireless charging system of claim 9, wherein the wireless power transmitting unit further comprises self-resonant absorbing elements placed between the transmitting coil and the shielding element.

13. The wireless charging system of claim 12, wherein resonant frequencies of the self-resonant absorbing elements are tuned to be equal to frequencies of peaks of electromagnetic radiation emitted by the transmitting coil.

14. The wireless charging system of claim 9, wherein the shielding element is made of at least one of a copper material or a ferrite material.

15. The wireless charging system of claim 9, wherein gaps between conductive turns of the transmitting coil decrease in a direction away from a center area of the transmitting coil.

16. The wireless charging system of claim 9, wherein turns of the transmitting coil have maximum curvature radiuses at outer edges of the transmitting coil and minimum curvature radiuses in a center area of the transmitting coil.

17. The wireless charging system of claim 9, wherein the wireless power receiving unit further comprises a shielding element disposed adjacent to the receiving coil and formed of a conductive material.

18. The wireless charging system of claim 17, wherein the shielding element is made of at least one of a copper material or a ferrite material.

19. The wireless charging system of claim 9, wherein the wireless power receiving unit further comprises:

at least two series capacitors serially connected to the receiving coil and configured to connect the receiving coil to the battery, and at least two inductors configured to connect each of the at least two series capacitors to the battery, and wherein the at least two receiving unit capacitors which are connected to the receiving coil in parallel and connect the receiving coil to the ground of the battery, further connect the at least two series capacitors and the at least two inductors to the ground of the battery.

* * * * *